(12) United States Patent
Kim et al.

(10) Patent No.: US 11,212,844 B2
(45) Date of Patent: Dec. 28, 2021

(54) METHOD AND APPARATUS FOR CONTROLLING NETWORK CONGESTION IN NEXT GENERATION MOBILE COMMUNICATION SYSTEM

(71) Applicant: Samsung Electronics Co., Ltd., Suwon-si (KR)

(72) Inventors: Sangbum Kim, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 75 days.

(21) Appl. No.: 16/621,094

(22) PCT Filed: Jun. 15, 2018

(86) PCT No.: PCT/KR2018/006792
§ 371 (c)(1),
(2) Date: Dec. 10, 2019

(87) PCT Pub. No.: WO2018/231012
PCT Pub. Date: Dec. 20, 2018

(65) Prior Publication Data
US 2020/0170044 A1    May 28, 2020

(30) Foreign Application Priority Data
Jun. 16, 2017 (KR) .......................... 10-2017-0076748

(51) Int. Cl.
*H04W 4/00* (2018.01)
*H04W 74/08* (2009.01)
(Continued)

(52) U.S. Cl.
CPC ...... *H04W 74/0833* (2013.01); *H04B 7/0617* (2013.01); *H04B 7/08* (2013.01);
(Continued)

(58) Field of Classification Search
CPC ........... H04W 74/0833; H04W 74/006; H04W 72/0446; H04W 28/06; H04B 7/0617; H04B 7/08
(Continued)

(56) References Cited

U.S. PATENT DOCUMENTS 9,107,225 B2 * 8/2015 Lee .................. H04W 74/0833
9,497,781 B2 11/2016 Jeffery et al.
(Continued)

FOREIGN PATENT DOCUMENTS

KR    10-2010-0019949 A    2/2010
KR    10-2010-0114852 A    10/2010
(Continued)

OTHER PUBLICATIONS

3GPP; TSGRAN; E-UTRA; Medium Access Conlrol (MAC) protocol specification (Release 14), 3GPP TS 36.321 V14.2.1; Apr. 17, 2017.
(Continued)

*Primary Examiner* — Thai D Hoang
(74) *Attorney, Agent, or Firm* — Jefferson IP Law, LLP

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present invention provides a method for random access by a terminal, the method comprising the steps of: transmitting a first message for random access to a base station; receiving, from the base station, a second message
(Continued)

including information related to backoff of each beam transmitted by the base station; and storing information related to the backoff of each beam.

13 Claims, 17 Drawing Sheets

(51) Int. Cl.
*H04B 7/06* (2006.01)
*H04B 7/08* (2006.01)
*H04W 28/06* (2009.01)
*H04W 72/04* (2009.01)
*H04W 74/00* (2009.01)

(52) U.S. Cl.
CPC ....... *H04W 28/06* (2013.01); *H04W 72/0446* (2013.01); *H04W 74/006* (2013.01)

(58) Field of Classification Search
USPC .................. 370/329–330, 335–345, 347–348
See application file for complete search history.

(56) References Cited

U.S. PATENT DOCUMENTS

| | | | |
|---|---|---|---|
| 10,154,520 B1* | 12/2018 | Hedayat | H04W 74/0833 |
| 10,602,549 B2* | 3/2020 | Tsai | H04B 7/088 |
| 10,813,137 B2* | 10/2020 | Shih | H04W 16/32 |
| 2011/0142000 A1 | 6/2011 | Han et al. | |
| 2012/0039180 A1 | 2/2012 | Kim et al. | |
| 2016/0302080 A1 | 10/2016 | Hwang et al. | |
| 2017/0171887 A1* | 6/2017 | Shi | H04W 16/14 |
| 2017/0230951 A1 | 8/2017 | Xiong et al. | |
| 2018/0124637 A1 | 5/2018 | Kim et al. | |
| 2018/0270869 A1* | 9/2018 | Tsai | H04W 76/27 |
| 2018/0279380 A1 | 9/2018 | Jung et al. | |
| 2018/0288810 A1* | 10/2018 | Ishii | H04W 48/12 |
| 2019/0173533 A1 | 6/2019 | Kim et al. | |
| 2019/0387541 A1* | 12/2019 | Agiwal | H04W 74/085 |
| 2020/0170044 A1* | 5/2020 | Kim | H04B 7/08 |
| 2020/0221506 A1* | 7/2020 | Jeon | H04W 74/0833 |
| 2021/0105813 A1* | 4/2021 | Lee | H04W 74/085 |

FOREIGN PATENT DOCUMENTS

| | | | |
|---|---|---|---|
| KR | 10-2016-0121437 A | 10/2016 | |
| KR | 10-2017-0039694 A | 4/2017 | |
| KR | 10-2018-0016301 A | 2/2018 | |
| WO | 2015/083997 A1 | 6/2015 | |
| WO | 2018/176038 A1 | 9/2018 | |

OTHER PUBLICATIONS

Huawei et al.: "RACH Backoff", 3GPP Draft; R2-1705190 Rach Backoff, 3rd Generation Partnership Project (3GPP), Mobile Compeience Centre; 650, Route Des Lucioles ; F-06921 Sophia-Antipolis Cedex ; France vol. RAN WG2, No. Hangzhou, China; May 15, 2017-May 19, 2017 May 14, 2017 (May 14, 2017), XP051275666, Retrieved from the Internet: URL: http://www.3gpp.org/ftp/Meetings_3GPP_SYNC/RAN2/Docs/.

Extended European Search Report dated Nov. 25, 2020, issued in European Application No. 18816525.2.

Korean Office Action dated Mar. 12, 2021, issued in Korean Patent Application No. 10-2017-0076748.

Korean Office Action dated Sep. 16, 2021, issued in Korean Patent Application No. 10-2017-0076748.

* cited by examiner (a) BI subheader in LTE (b) Example 1: beam-specific BI (c) Example 2: beam-specific BI (d) Example 3: beam-specific BI

METHOD AND APPARATUS FOR CONTROLLING NETWORK CONGESTION IN NEXT GENERATION MOBILE COMMUNICATION SYSTEM

TECHNICAL FIELD

The disclosure relates to a method and apparatus for operations of a terminal and a base station that control network congestion for each antenna beam in a next generation mobile communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

A next generation mobile communication system may be required to have a frequency bandwidth equal to or greater than a conventional maximum bandwidth in order to implement super-high-speed data transmission, compared to conventional LTE, and may also consider a scenario of being operated at a high frequency to secure a wide frequency bandwidth. That is, a next generation mobile communication system may perform communication at a high frequency band, but transmitting a signal in a high frequency band communication may be difficult. Therefore, the next generation mobile communication system may consider a scenario of generating a beam to transmit data. Accordingly, a method and apparatus for controlling network congestion for each antenna beam is required.

DISCLOSURE OF INVENTION

Technical Problem

An aspect of the disclosure is to propose a method in which when data is transmitted by generating a beam in a high frequency domain to secure a wide frequency bandwidth in a next generation mobile communication system, in order to determine which beam is used by a terminal to communicate with a transmission reception point, an overhead subframe (osf) is measured to provide a backoff indicator for each beam, so as to efficiently control network congestion for each antenna beam.

In addition, another aspect of the disclosure is to propose a method wherein: in a L2 layer, a RLC concatenation operation causing complexity is excluded to process a packet transmitted at a high speed in a next generation mobile communication system; in an RLC layer, a RLC SDU and a corresponding header are previously generated before a terminal receives an UL grant, and thus are transferred to a lower layer immediately at the time of receiving the UL grant; and in a MAC layer, a dispersed format in which a subheader corresponding to a MAC SDU and the corresponding MAC SDU are inserted sequentially while being combined into a pair, is applied even to a random access response MAC PDU so as to more efficiently configure a random access response message.

Solution to Problem

The disclosure provides a method for performing random access by a terminal, the method including: transmitting a first message for performing random access to a base station; receiving, from the base station, a second message including information related to backoff of each beam transmitted by the base station; and storing the information related to backoff of each beam.

The method for performing random access by the terminal may include: transmitting a third message to the base station, based on uplink grant information included in the second message; and if a fourth message corresponding to the third message is not received within a pre-configured time interval after the transmission of the third message, retransmitting the first message, based on the information related to backoff.

The information related to backoff may include information related to a retransmission timing range of the first message, wherein the retransmitting of the first message may include: randomly determining a retransmission timing of the first message within the retransmission timing range of the first message; and after the determined retransmission timing, retransmitting the first message.

The method for performing random access by the terminal may further include, if a fourth message corresponding to the third message is received within the pre-configured time interval after the transmission of the third message, resetting the stored information related to backoff.

The method for performing random access by the terminal may further include receiving information related to a beam group including at least one beam from the base station, wherein the storing of the information related to backoff of each beam may include storing information related to backoff of each beam group, based on the information related to a beam group.

The disclosure provides a method for performing random access by a base station, the method including: receiving a first message for performing random access from a terminal; generating information related to backoff of each beam transmitted by the base station; and transmitting the information related to backoff of each beam through a second message to the terminal.

The method for performing random access by the base station may further include transmitting information related to a beam group including at least one beam to the terminal.

The generating of the information related to backoff of each beam may include generating information related to backoff of each beam group, based on the information related to a beam group.

The disclosure provides a terminal including: a transceiver; a storage unit; and a control unit configured to control the transceiver to transmit a first message for performing random access to a base station, control the transceiver to receive, from the base station, a second message including information related to backoff of each beam transmitted by the base station, and store the information related to backoff of each beam in the storage unit.

The control unit may control the transceiver to transmit a third message to the base station, based on uplink grant information included in the second message, and control the transceiver to, if a fourth message corresponding to the third message is not received within a pre-configured time interval after the transmission of the third message, retransmit the first message, based on the information related to backoff.

The information related to backoff may include information related to a retransmission timing range of the first message, wherein the control unit may randomly determine a retransmission timing of the first message within the retransmission timing range of the first message, and control the transceiver to, after the determined retransmission timing, retransmit the first message.

If a fourth message corresponding to the third message is received within the pre-configured time interval after the transmission of the third message, the control unit may reset information related to backoff, which is stored in the storage unit.

The control unit may control the transceiver to receive information related to a beam group including at least one beam from the base station, wherein the control unit may store information related to backoff of each beam group in the storage unit, based on the information related to a beam group.

The disclosure provides a base station including: a transceiver; and a control unit configured to control the transceiver to receive a first message for performing random access from a terminal, generate information related to backoff of each beam transmitted by the base station, and control the transceiver to transmit the information related to backoff of each beam through a second message to the terminal.

The control unit may control the transceiver to transmit information related to a beam group including at least one beam to the terminal.

Advantageous Effects of Invention

According to an embodiment in the disclosure, in order to determine which beam is used by a terminal to communicate with a transmission reception point, a base station measures an overhead subframe to provide a backoff indicator for each beam, whereby network congestion can be efficiently controlled for each antenna beam.

In addition, according to an embodiment in the disclosure, in an RLC layer, a RLC SDU and a corresponding header are previously generated before a terminal receives an UL grant, and thus are transferred to a lower layer immediately at the time of receiving the UL grant, and in a MAC layer, a dispersed format in which a subheader corresponding to a MAC SDU and the corresponding MAC SDU are inserted sequentially while being combined into a pair, is applied even to a random access response MAC PDU, whereby a random access response message can be more efficiently configured.

MODE FOR THE INVENTION

Figure 1A:
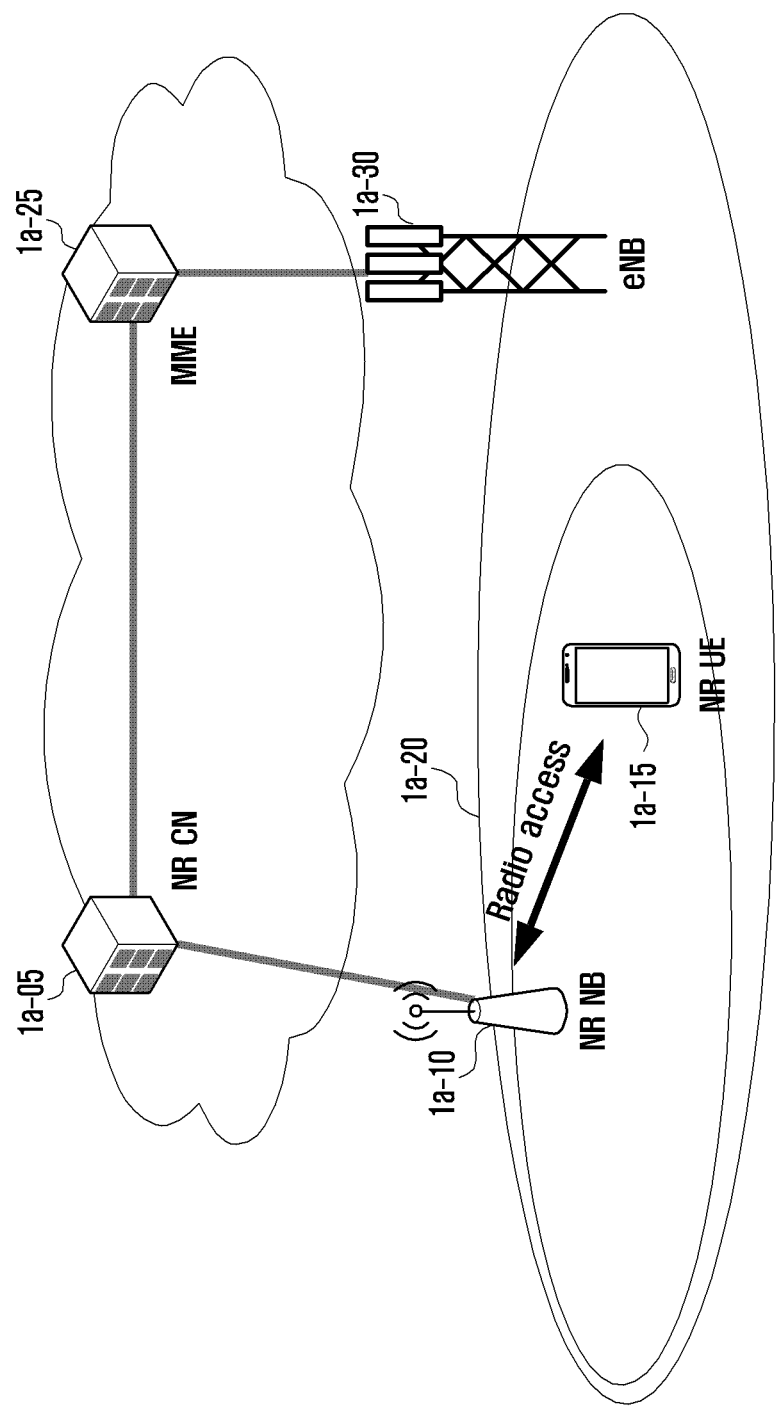
FIG. 1A illustrates a structure of a next generation mobile communication system.

Hereinafter, embodiments of the disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

First Embodiment

FIG. 1A illustrates a structure of a next generation mobile communication system.

As illustrated with reference to FIG. 1A, a wireless access network of a next generation mobile communication system includes a next generation base station (new radio node B, hereinafter, NR NB) 1a-10 and a new radio core network (NR CN) 1a-05. A user equipment (new radio user equipment, hereinafter NR UE or terminal) 1a-15 is configured to access an external network through the NR NB 1a-10 and the NR CN 1a-05.

In FIG. 1A, the NR NB 1a-10 corresponds to an evolved node B (eNB) of a conventional LTE system. The NR NB is connected to the NR UE 1a-15 with a wireless channel and can provide a superior service than the conventional node B. In the next generation mobile communication system, the entire user traffic is serviced through a shared channel, and therefore, a device configured to collect pieces of state information, such as a buffer state, an available transmission power state, and a channel state of UEs, and then perform scheduling is required, and the NR NB 1a-10 serves as the device. A single NR NB normally controls a plurality of cells. The NR NB may have a bandwidth equal to or greater than a conventional maximum bandwidth in order to implement a super-high-speed data transmission, compared to the conventional LTE, and may use orthogonal frequency division multiplexing (hereinafter, referred to as OFDM) as a wireless access technology while additionally combining a beamforming technology to the OFDM. Further, the NR NB applies an adaptive modulation and coding (hereinafter, referred to as AMC) scheme of determining a channel coding rate and a modulation scheme according to the channel state of the terminal. The NR CN 1a-05 is configured to perform functions, such as mobility support, bearer configuration, and QoS configuration. The NR CN is a device serving various control functions as well as a mobility management function for the terminal and is connected to a plurality of base stations. In addition, the next generation mobile communication system may interwork with the conventional LTE system, and the NR CN is connected to a MME 1a-25 through a network interface. The MME is connected to an eNB 1a-30 which is a conventional base station.

Figure 1B:
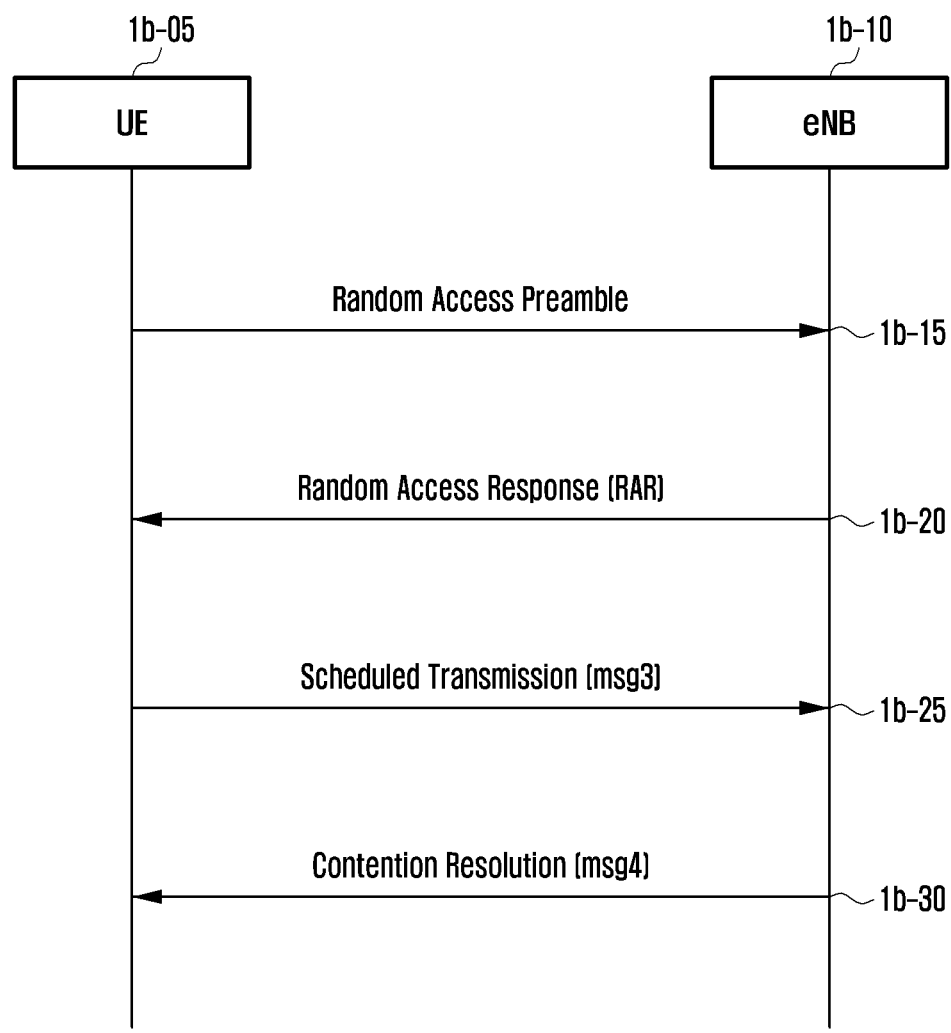
FIG. 1B illustrates a random access procedure in a conventional LTE system.

FIG. 1B illustrates a random access procedure in a conventional LTE system.

Random access is performed at the time of establishing uplink synchronization or transmitting data through a network. More specifically, random access may be performed when a mode is converted from a standby mode to a connection mode, RRC re-establishment is performed, handover is performed, or uplink or downlink data starts. If a terminal 1b-05 receives a dedicated preamble from a base station 1b-10, the terminal applies the dedicated preamble to transmit a preamble. Otherwise, the terminal selects one group among two preamble groups and selects a preamble belonging to the selected group. The groups are called group A and group B. If a channel quality state is better than a particular threshold value and the size of msg 3 is greater than a particular threshold value, the terminal selects a preamble belonging to group A, and otherwise, the terminal selects a preamble belonging to group B. If the preamble is transmitted in an n-th subframe (operation 1b-15), a RAR window starts from a (n+3)th subframe, and the terminal monitors whether a RAR is transmitted within the time interval of the window (operation 1b-20). Scheduling information relating to the RAR is indicated by a RA-RNTI of a PDCCH. The RA-RNTI is derived by using a wireless resource position in time and frequency axes, which has been used to transmit the preamble. The RAR includes a timing advance command, an UL grant, and a temporary C-RNTI. If the RAR is successfully received within the RAR window, the terminal transmits msg 3 by using information relating to the UL grant included in the RAR (operation 1b-25). Msg 3 includes different pieces of information according to purposes of the random access. Table 1 below shows an example of pieces of information carried by msg 3.

TABLE 1

Example of pieces of information included in msg 3

| CASE | Message 3 Contents |
|---|---|
| RRC CONNECTION SETUP | CCCH SDU |
| RRC RE-ESTABLISHMENT | CCCH SDU, BSR (if grant is enough), PHR (if triggered & grant is enough) |
| Handover (random preamble) | C-RNTI CE, BSR, PHR, (part of) DCCH SDU |
| Handover (dedicate preamble) | BSR, PHR, (part of) DCCH SDU |
| UL resume | C RNTI CE, BSR, PHR, (part of) DCCH/CTCH SDU |
| PDCCH order (random preamble) | C RNTI CE, BSR, PHR, (part of) DCCH/DTCH SDU |
| PDCCH order (dedicate preamble) | BSR, PHR, (part of) DCCH/DTCH SDU |

If the terminal receives the RAR in an n-th subframe, msg 3 is transmitted in a (n+6)th subframe. An HARQ is applied to and after msg 3. After the transmission of msg 3, the terminal operates a particular timer, and monitors a contention resolution (CR) message until before the timer has expired (operation 1b-30). The CR message includes, as well as a CR MAC CE, a RRC connection setup message, a RRC connection reestablishment message, or the like according to purposes of the random access.

Figure 1C:
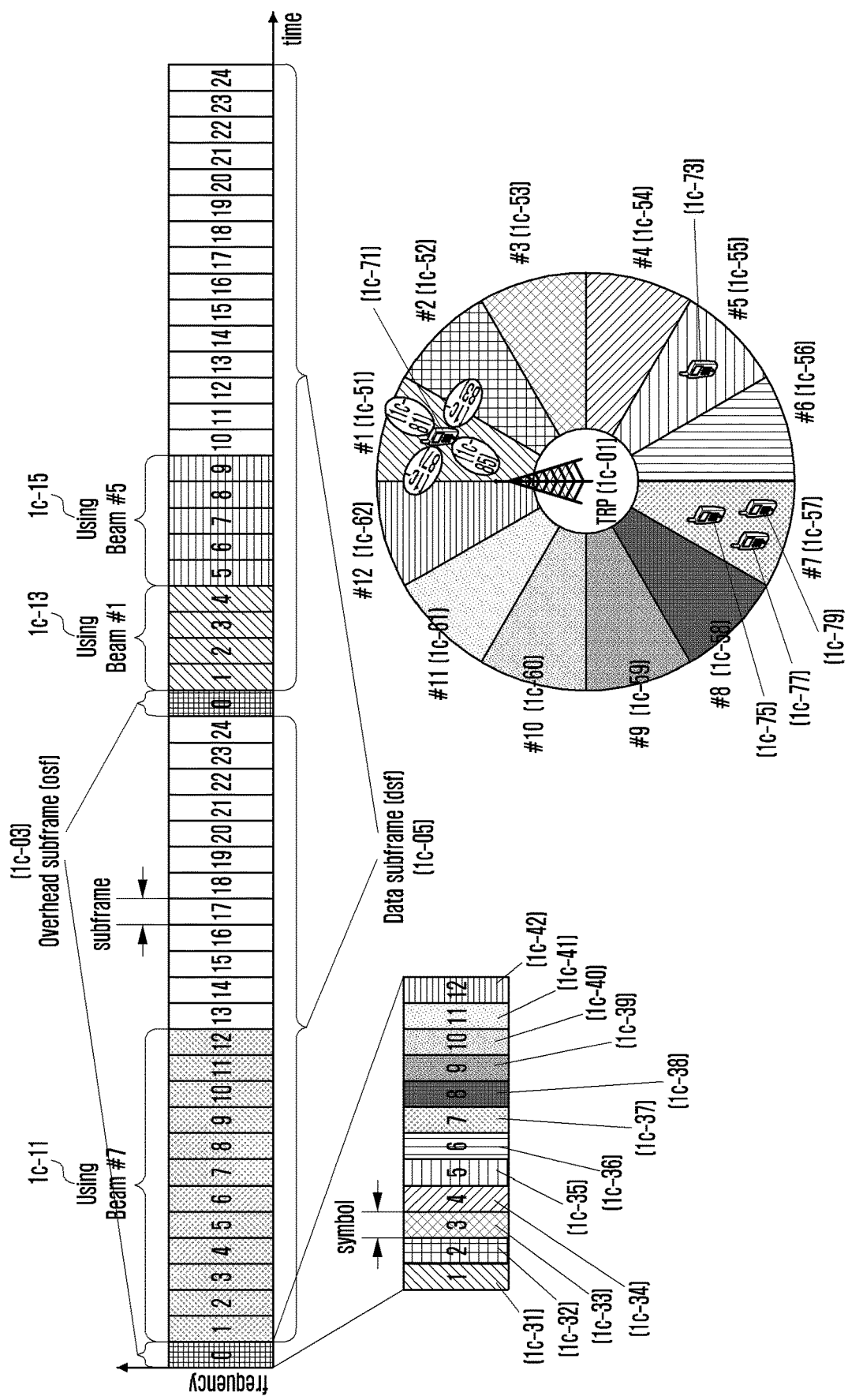
FIG. 1C illustrates an example of a frame structure used by a NR system to which the disclosure is applied.

FIG. 1C illustrates an example of a frame structure used by a NR system to which the disclosure is applied.

A NR system may consider a scenario of being operated at a high frequency to secure a wide frequency bandwidth for a higher transfer rate, and may consider a scenario of generating a beam to transmit data because there may be a difficulty in transmitting a signal at a high frequency.

Therefore, a base station or a transmission reception point (hereinafter, TRP) 1c-01 may consider a scenario of using different beams to communicate with terminals 1c-71, 1c-73, 1c-75, 1c-77, and 1c-79 in a cell. That is, in the exemplary drawing, a scenario where terminal 1 1c-71 performs communication by using beam #1 1c-51, terminal 2 1c-73 performs communication by using beam #5 1c-55, and terminals 3, 4, and 5 1c-75, 1c-77, and 1c-79 perform communication by using beam #7 1c-57 is assumed.

In order to measure a beam which a terminal uses to communicate the TRP, an overhead subframe (osf) 1c-03 exists in a time domain, and the base station transmits a reference signal in the osf by using different beams for each symbol (or through several symbols). A beam index value for distinguishing each beam may be derived from the reference signal. In the exemplary drawing, it is assumed that the base station transmits 12 beams #1 1c-51 to #12 1c-62 and different beams are swept and transmitted for each symbol in the osf. That is, a beam is transmitted for each symbol in the osf (for example, beam #1 1c-51 is transmitted through a first symbol 1c-31), and therefore, the terminal may measure a beam by which the strongest signal is transmitted in the osf, by measuring the osf.

In the exemplary drawing, a scenario where the corresponding osf is repeated every 25 subframes is assumed, and the remaining 24 subframes correspond to data subframes (dsf) 1c-05 in which normal data is transmitted or received.

A scenario where terminals 3, 4, and 5 1c-75, 1c-77, and 1c-79 perform communication by commonly using beam #7 (operation 1c-11), terminal 1 1c-71 performs communication by using beam #1 (operation 1c-13), and terminal 2 1c-73 performs communication by using beam #5 (operation 1c-15) according to scheduling of the base station is assumed.

In the exemplary drawing, transmission beams #1 1c-51 to #12 1c-62 of the base station are mainly schematized, but reception beams (for example, beams 1c-81, 1c-83, 1c-85, and 1c-87 of terminal 1 1c-71) of a terminal, which are designed to receive the transmission beams of the base station, may be additionally considered. In the exemplary drawing, terminal 1 has four beams 1c-81, 1c-83, 1c-85, and 1c-87 and performs beam sweeping to determine which beam exhibits the best reception performance. If the terminal is not able to use several beams at the same time, the terminal may use a single reception beam for each osf to receive as many several osfs as the number of reception beams so as to find an optimal transmission beam of the base station and an optimal reception beam of the terminal.

In the disclosure, a backoff indicator is provided for each beam in order to control a network congestion situation for each beam. Since each beam covers a particular zone in a cell, more users may be located in a particular beam. For example, only a single terminal 1c-73 is located in the fifth beam 1c-55, but three terminals 1c-75, 1c-77, and 1c-79 are located in the seventh beam 1c-57. Therefore, the number of occurrences of random access may be different for each beam. Therefore, it is more preferable to control a congestion situation for each beam rather than for each cell. There are various methods by which a network congestion situation can be controlled. One of the methods is to use a backoff indicator. The backoff indicator is provided to terminals in a cell after being included in a subheader of a random access response message in a random access procedure. A terminal having failed random access derives one random value among 0 to the backoff indicator, and waits until the derived random value is reached, and then attempts to perform random access again. That is, the backoff indicator provides an effect of redistributing terminals having collided with each other in terms of time.

Figure 1D:
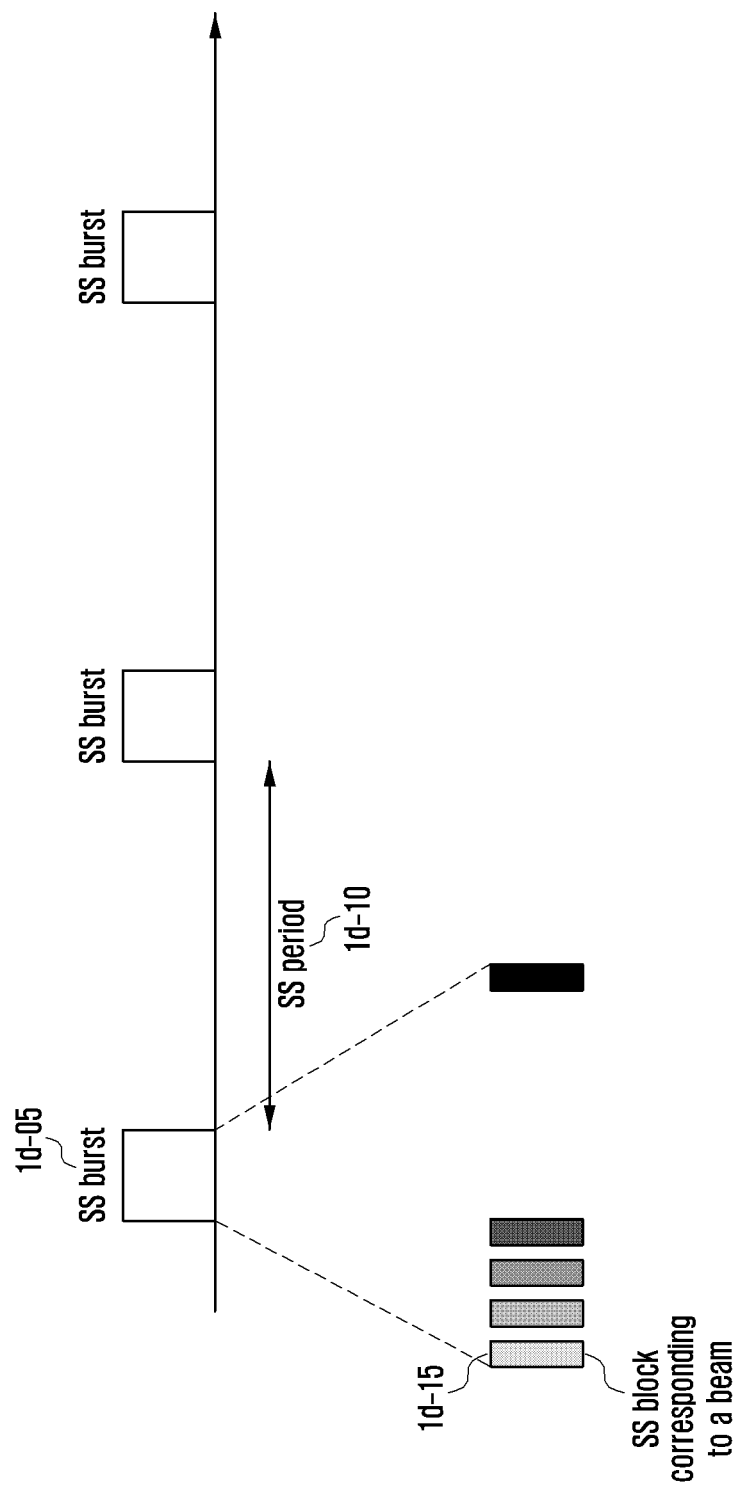
FIG. 1D illustrates a structure in which a SS block is transmitted for each antenna beam in a next generation mobile communication system.

FIG. 1D illustrates a structure in which a SS block is transmitted for each antenna beam in a next generation mobile communication system.

In a next generation mobile communication system, a SS block 1d-15 is transmitted in order to evaluate a downlink signal quality and perform downlink synchronization for each antenna beam. A single SS block corresponds to a single antenna beam and is transmitted by the antenna beam corresponding to the SS block without an overlap of time. The SS block has an index value corresponding thereto. The index value may be derived by decoding the SS block and may be implicitly derived according to a time or frequency resource through which the SS block is transmitted. One or more SS blocks may be transmitted after being concatenated in a particular time interval, and the group of the SS blocks is called a SS burst 1d-05. The SS burst may be repeatedly transmitted according to a particular period 1d-10.

Therefore, in the disclosure, a backoff indicator for each beam is addressed by using index information indicating a SS block.

Figure 1E:
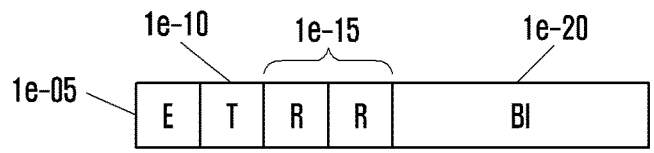
FIG. 1E is a diagrams illustrating a BI subheader including a backoff indicator for each antenna beam in a next generation mobile communication system.
Figure 1E:
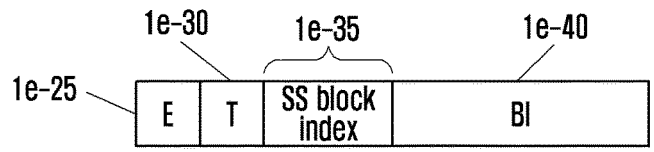
Figure 1E:
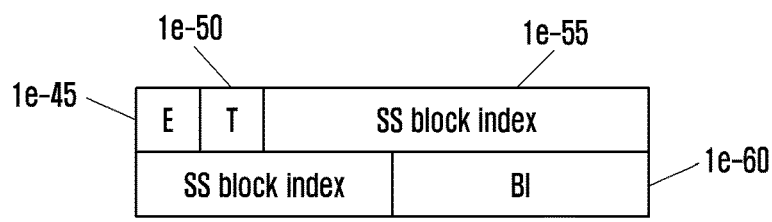
Figure 1E:
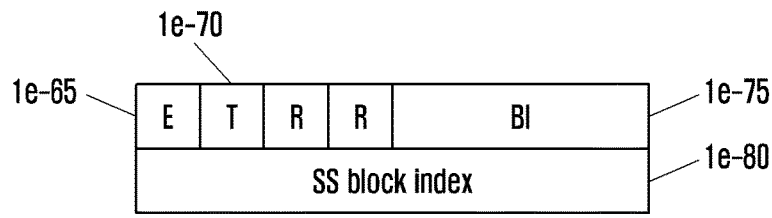

Diagrams (a), (b), (c), and (d) of FIG. 1E illustrate a BI subheader including a backoff indicator for each antenna beam in a next generation mobile communication system.

Diagram (a) of FIG. 1E illustrates an E/T/R/R/BI MAC subheader in a conventional LTE technology. An E field 1e-05 indicates whether another MAC subheader exists. A T field 1e-10 is used to indicate whether the corresponding subheader includes a BI 1e-15 or a random access ID (RAPID). An R field is a reserved bit. A BI field 1e-20 is used to derive a backoff time and has a total size of 4 bits. In the LTE technology, only a single subheader including a BI field exists in a single random access response message.

Diagram (b) of FIG. 1E illustrates a first format including a BI field, which is proposed in the disclosure. The purposes of an E field 1e-25 and a T field 1e-30 are identical to those of the fields indicated by the same names in the LTE. A field 1e-35 including a SS block index value follows the E field and the T field. A BI field 1e-40 including a backoff indicator applied to a beam indicated by the SS block index follows the field 1e-35.

Diagram (c) of FIG. 1E illustrates a second format including a BI field, which is proposed in the disclosure. The first format may use only two bits to indicate the SS block index. Therefore, a total number of indicatable beams is four. However, beams, the number of which exceeds four, may exist in a real network. Therefore, the second format allocates more bits to indicate a SS block index. For example, the second format defines a subheader including a BI field and having two bytes and allocates 10 bits among two bytes for a SS block index. As described with respect to the first format, the purposes of an E field 1e-45 and a T field 1e-50 are identical to those of the fields indicated by the same names in the LTE. A field 1e-55 including a SS block index value follows the E field and the T field. A BI field 1e-60 including a backoff indicator applied to a beam indicated by the SS block index follows the field 1e-55.

of FIG. 1E (d) illustrates a third format including a BI field, which is proposed in the disclosure. A new format including a rearranged order of fields may be defined differently from the second format. For example, in a subheader configured by two bytes, the subheader represented by first one byte 1d-65, 1d-70, and 1d-75 is identical to the subheader of the conventional LTE, and second one byte 1e-80 is used to indicate a SS block index.

In the disclosure, a single random access response message includes subheaders including a plurality of BI fields. Therefore, a base station may provide backoff indicators for various beams to terminals by using a single random access response message.

A beam not indicated by a SS block index may exist. In the case of the unindicated beam, a BI field corresponding to a pre-defined particular SS block index may be applied, or a default index is separately defined, and a BI field included in a subheader including the index may be applied.

The formats provide a BI field for each single beam, but may provide a BI field for each group including a plurality of beams. That is, a format described above may substitute a SS block index with an index value indicating a particular beam group. A base station informs a terminal of which beam is included in a particular beam group, through system information.

Figure 1F:
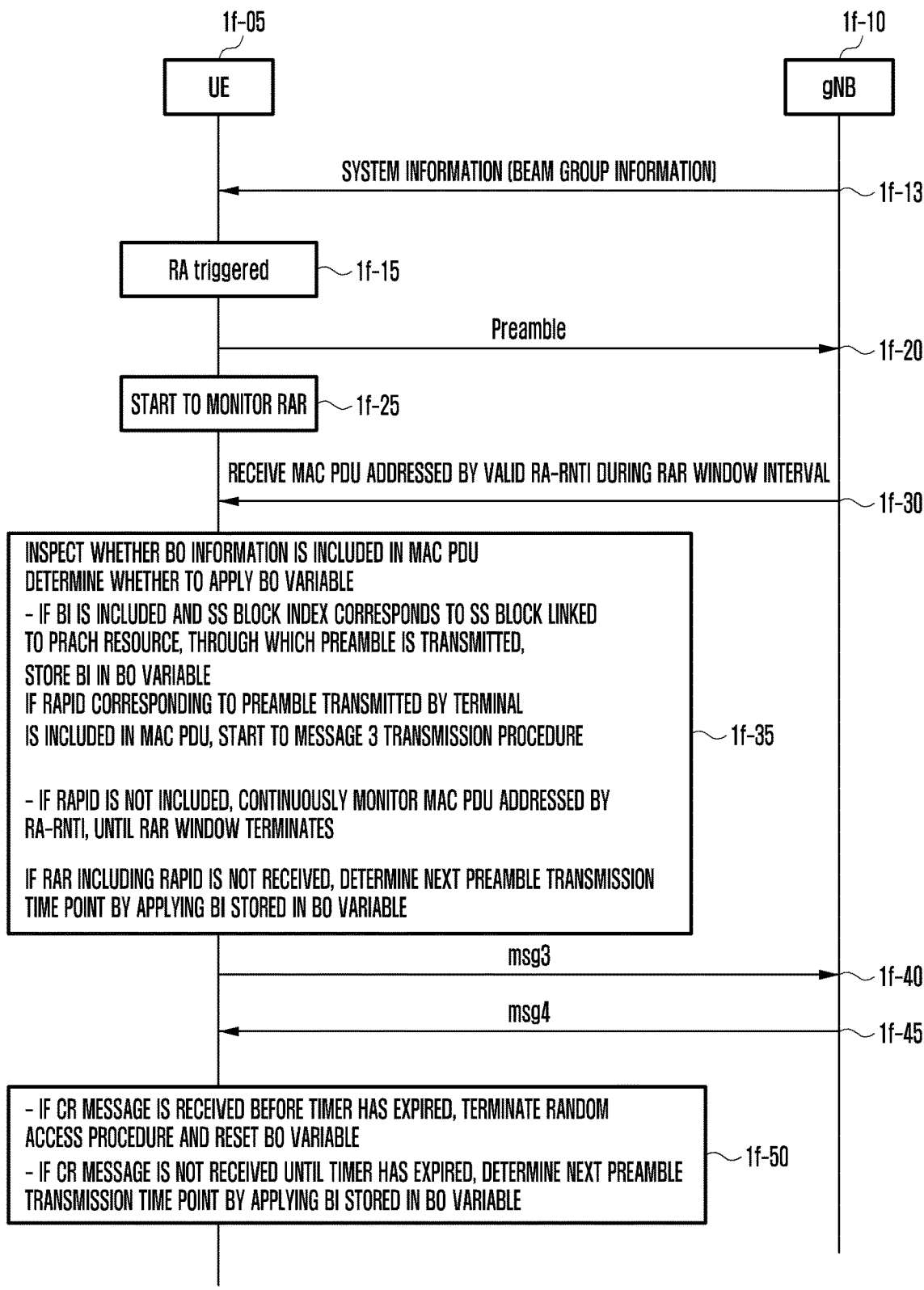
FIG. 1F is a flowchart in which a random access procedure is performed by applying a backoff indicator for each antenna beam in a next generation mobile communication system.

FIG. 1F is a flowchart in which a random access procedure is performed by applying a backoff indicator for each antenna beam in a next generation mobile communication system.

A terminal 1f-05 receives beam group information from a base station 1f-10 through system information (operation 1f-13). The beam group information indicates which beams are included in a particular beam group. In the disclosure, the beam group information is valid only in the case where a backoff indicator is provided for each particular beam group. The terminal triggers random access (operation 1f-15) and transmits a preamble to the base station (operation 1f-20). After the transmission of the preamble, the terminal monitors whether a random access response message corresponding to the preamble is received during a particular time interval, i.e. a RAR window (operation 1f-25). The terminal receives a MAC PDU, i.e. the random access response message, indicated by a RA-RNTI in the RAR window (operation 1f-30). The terminal determines whether a subheader including a BI field exists in the MAC PDU. The terminal also determines whether to apply a backoff indicator included in the BI field (operation 1f-35). If the BI is included and a SS block index corresponds to a SS block corresponding to a PRACH resource, through which the preamble is transmitted, the terminal stores information relating the backoff. If a RAPID corresponding to the preamble transmitted by the terminal is included in the MAC PDU, a message 3 transmission procedure starts. The terminal operates a contention resolution timer together with the transmission of message 3 (operation 1f-40). If the terminal successfully receives msg 4 (operation 1f-45) before the timer has expired, the terminal terminates the random access procedure and resets a backoff variable (operation 1f-50). If the RAPID corresponding to the preamble transmitted by the terminal is not included, the terminal continuously monitors the MAC PDU addressed by the RA-RNTI, until the RAR window terminates. If a RAR including the RAPID is not received, the terminal determines a next preamble transmission time point by applying the BI stored in the backoff variable. If a CR message is not received until the timer has expired, the terminal also determines a next preamble transmission time point by applying the BI stored in the BO variable.

In the case where a backoff indicator is provided for each beam group, if a BI is included and a SS block index corresponds to a beam group including a SS block corresponding to a PRACH resource, through which a preamble is transmitted, the terminal stores information relating to the backoff.

Figure 1G:
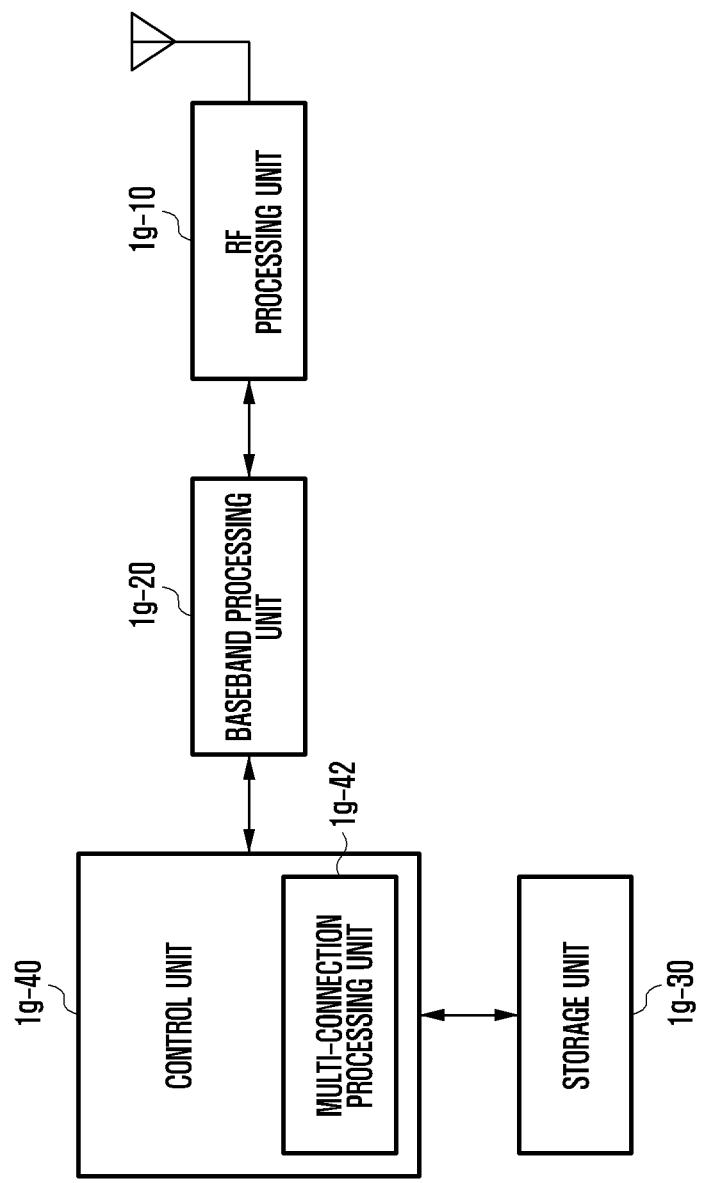
FIG. 1G is a block diagram illustrating an internal structure of a terminal to which the disclosure is applied.

FIG. 1G illustrates a structure of a terminal.

Referring to FIG. 1G, the terminal includes a radio frequency (RF) processing unit 1g-10, a baseband processing unit 1g-20, a storage unit 1g-30, and a control unit 1g-40.

The RF processing unit 1g-10 performs a function for transmitting or receiving a signal through a wireless channel, such as band conversion and amplification of a signal. That is, the RF processing unit 1g-10 upconverts a baseband signal provided from the baseband processing unit 1g-20, into an RF band signal, and then transmits the converted signal through an antenna, and downconverts an RF band signal received through the antenna, into a baseband signal. For example, the RF processing unit 1g-10 may include a transmission filter, a reception filter, an amplifier, a mixer, an oscillator, a digital-to-analog convertor (DAC), an analog-to-digital convertor (ADC), and the like. FIG. 1G illustrates only a single antenna, but the terminal may include a plurality of antennas. In addition, the RF processing unit 1g-10 may include a plurality of RF chains. Moreover, the RF processing unit 1g-10 may perform beamforming. For the beamforming, the RF processing unit 1g-10 may control a phase and a size of each of signals transmitted or received through a plurality of antennas or antenna elements. In addition, the RF processing unit may perform MIMO, and may receive several layers at the time of performing a MIMO operation.

The baseband processing unit 1g-20 performs a function of conversion between a baseband signal and a bitstream according to a physical layer standard of the system. For example, when data is transmitted, the baseband processing unit 1g-20 generates complex symbols by encoding and modulating a transmission bitstream. Further, when data is received, the baseband processing unit 1g-20 reconstructs a reception bitstream by demodulating and decoding a baseband signal provided from the RF processing unit 1g-10. For example, in an orthogonal frequency division multiplexing (OFDM) scheme, when data is transmitted, the baseband processing unit 1g-20 generates complex symbols by encoding and modulating a transmission bitstream, maps the complex symbols to subcarriers, and then configures OFDM symbols through an inverse fast Fourier transform (IFFT) operation and a cyclic prefix (CP) insertion. Further, when data is received, the baseband processing unit 1g-20 divides a baseband signal provided from the RF processing unit 1g-10 in the units of OFDM symbols, reconstructs signals mapped to subcarriers, through a fast Fourier transform (FFT) operation, and then reconstructs a reception bitstream through demodulation and decoding.

The baseband processing unit 1g-20 and the RF processing unit 1g-10 transmit and receive a signal as described above. Accordingly, the baseband processing unit 1g-20 and the RF processing unit 1g-10 may be referred to as a transmitter, a receiver, a transceiver, or a communication unit. Further, at least one of the baseband processing unit 1g-20 and the RF processing unit 1g-10 may include a plurality of communication modules to support a plurality of different wireless access technologies. In addition, at least one of the baseband processing unit 1g-20 and the RF processing unit 1g-10 may include different communication modules to process signals of different frequency bands. For example, the different wireless access technologies may include a wireless LAN (for example, IEEE 802.11), a cellular network (for example, LTE), and the like. Further, the different frequency bands may include a super high frequency (SHF) (for example, 2.NRHz, NRhz) band and a millimeter (mm) wave (for example, 60 GHz) band.

The storage unit 1g-30 stores data such as a basic program, an application program, and configuration information for the operation of the terminal. Particularly, the storage unit 1g-30 may store information relating to a second access node configured to perform wireless communication by using a second wireless access technology. Further, the storage unit 1g-30 provides stored data in response to a request of the control unit 1g-40.

The control unit 1g-40 controls overall operations of the terminal. For example, the control unit 1g-40 transmits or receives a signal through the baseband processing unit 1g-20 and the RF processing unit 1g-10. Further, the control unit 1g-40 records and reads data in and from the storage unit 1g-30. To this end, the control unit 1g-40 may include at least one processor. For example, the control unit 1g-40 may include a communication processor (CP) that performs control for communication, and an application processor (AP) that controls a higher layer such as an application program. The control unit 1g-40 includes a multi-connection processing unit 1g-42 that performs processing for operating a multi-connection mode.

Figure 2:
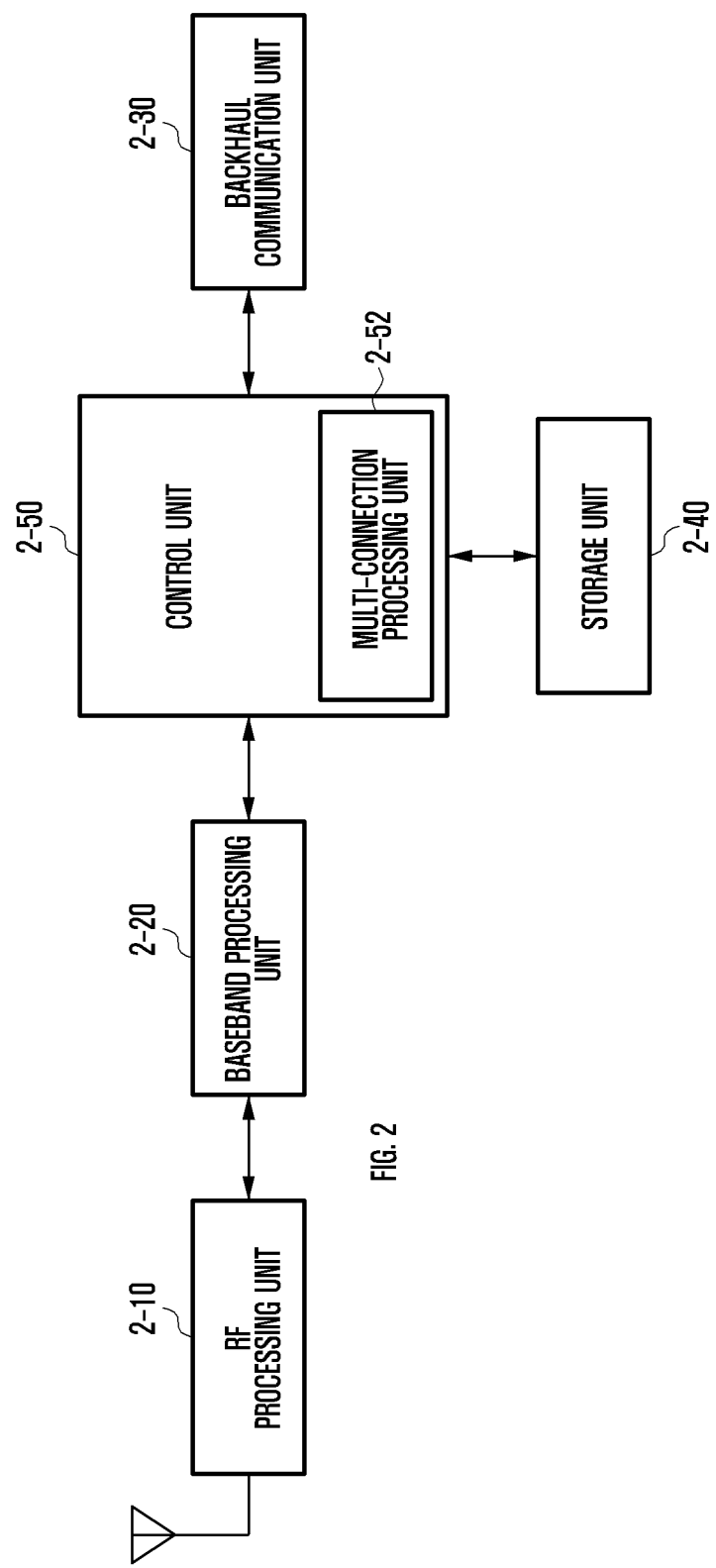
FIG. 2 is a block diagram illustrating a configuration of a base station according to the disclosure.

FIG. 2 illustrates a block diagram of a main base station in a wireless communication system according to an embodiment of the disclosure.

As illustrated in FIG. 2, the base station includes an RF processing unit 2-10, a baseband processing unit 2-20, a backhaul communication unit 2-30, a storage unit 2-40, and a control unit 2-50.

The RF processing unit 2-10 performs a function for transmitting or receiving a signal through a wireless channel, such as band conversion and amplification of a signal. That is, the RF processing unit 2-10 upconverts a baseband signal provided from the baseband processing unit 2-20 into an RF band signal and then transmits the converted signal through an antenna, and downconverts an RF band signal received through the antenna into a baseband signal. For example, the RF processing unit 2-10 may include a transmission filter, a reception filter, an amplifier, a mixer, an oscillator, a DAC, an ADC, and the like. FIG. 2 illustrates only a single antenna, but the base station may include a plurality of antennas. In addition, the RF processing unit 2-10 may include a plurality of RF chains. Moreover, the RF processing unit 2-10 may perform beamforming. For the beamforming, the RF processing unit 2-10 may control a phase and a size of each of signals transmitted or received through a plurality of antennas or antenna elements. The RF processing unit may perform a downlink MIMO operation by transmitting one or more layers.

The baseband processing unit 2-20 performs a function of conversion between a baseband signal and a bitstream according to a physical layer standard. For example, when data is transmitted, the baseband processing unit 2-20 generates complex symbols by encoding and modulating a transmission bitstream. Further, when data is received, the baseband processing unit 2-20 reconstructs a reception bitstream by demodulating and decoding a baseband signal provided from the RF processing unit 2-10. For example, in an OFDM scheme, when data is transmitted, the baseband processing unit 2-20 generates complex symbols by encoding and modulating a transmission bitstream, maps the complex symbols to subcarriers, and then configures OFDM symbols through an IFFT operation and a CP insertion. In addition, when data is received, the baseband processing unit 2-20 divides a baseband signal provided from the RF processing unit 2-10 in the units of OFDM symbols, reconstructs signals mapped to subcarriers, through an FFT operation, and then reconstructs a reception bitstream through demodulation and decoding. The baseband processing unit 2-20 and the RF processing unit 2-10 transmit and receive a signal as described above. Accordingly, the baseband processing unit 2-20 and the RF processing unit 2-10 may be referred to as a transmitter, a receiver, a transceiver, a communication unit, or a wireless communication unit.

The backhaul communication unit 2-30 provides an interface configured to communicate with other nodes in the network. That is, the backhaul communication unit 2-30 converts, into a physical signal, a bitstream transmitted from the base station to another node, for example, an auxiliary base station, a core network, etc. and converts, into a bitstream, a physical signal received from the other nodes.

The storage unit 2-40 stores data such as a basic program, an application program, and configuration information for the operation of the main base station. Particularly, the storage unit 2-40 may store information relating to a bearer allocated to a connected terminal, a measurement result reported by the connected terminal, and the like. In addition, the storage unit 2-40 may store information serving as a determination criterion of whether to provide multi-connection to a terminal or stop providing same. In addition, the storage unit 2-40 provides stored data in response to a request of the control unit 2-50.

The control unit 2-50 controls overall operations of the main base station. For example, the control unit 2-50 transmits or receives a signal through the baseband processing unit 2-20 and the RF processing unit 2-10, or through the backhaul communication unit 2-30. Further, the control unit 2-50 records and reads data in and from the storage unit 2-40. To this end, the control unit 2-50 may include at least one processor. The control unit 2-50 includes a multi-connection processing unit 2-52 that performs processing for operating a multi-connection mode.

Third Embodiment

Figure 3A:
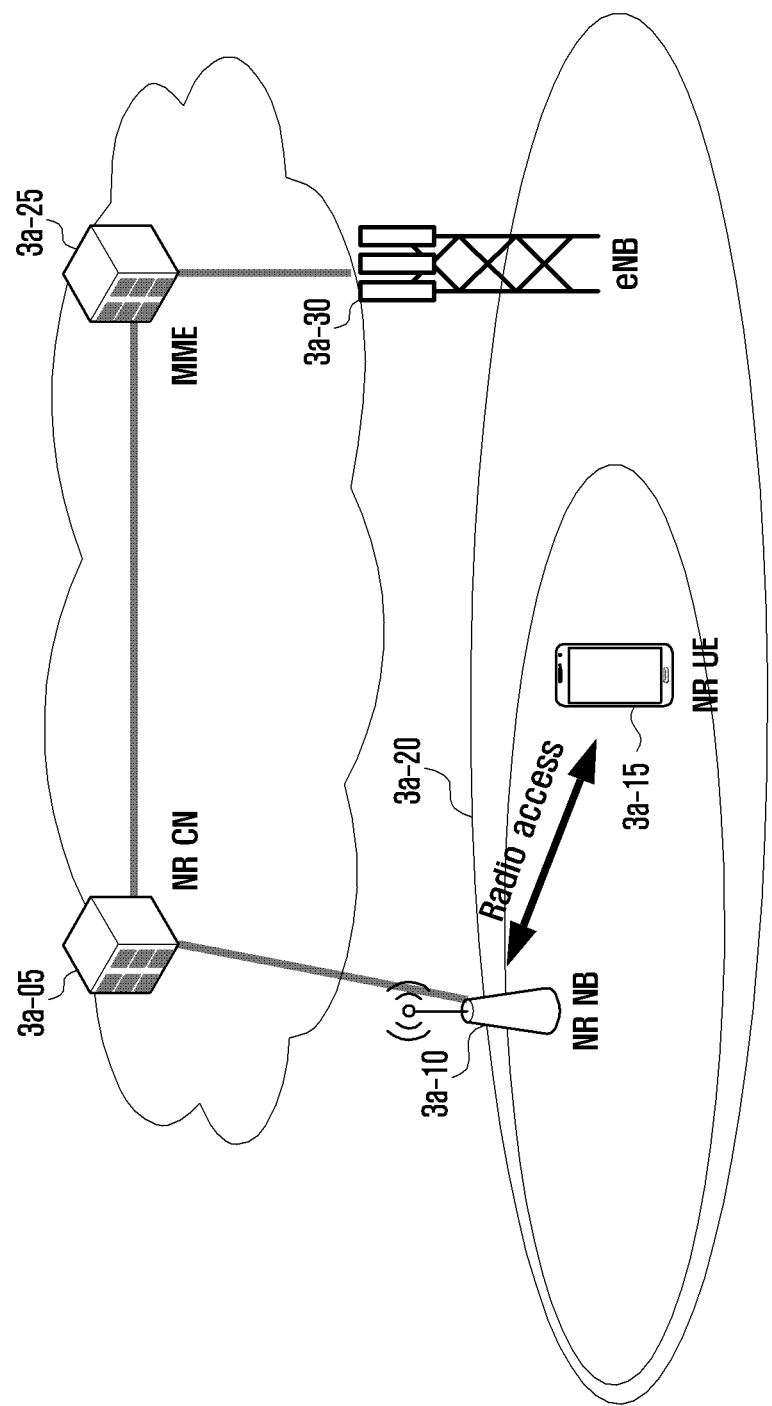
FIG. 3A illustrates a structure of a next generation mobile communication system.

FIG. 3A illustrates a structure of a next generation mobile communication system.

As illustrated with reference to FIG. 3A, a wireless access network of a next generation mobile communication system includes a next generation base station (new radio node B, hereinafter, NR NB) 3a-10 and a new radio core network (NR CN) 3a-05. A user equipment (new radio user equipment, hereinafter NR UE or terminal) 3a-15 is configured to access an external network through the NR NB 3a-10 and the NR CN 3a-05.

In FIG. 3A, the NR NB 3a-10 corresponds to an evolved node B (eNB) of a conventional LTE system. The NR NB is connected to the NR UE 3a-15 with a wireless channel and can provide a superior service than the conventional node B. In the next generation mobile communication system, the entire user traffic is serviced through a shared channel, and therefore, a device configured to collect pieces of state information, such as a buffer state, an available transmission power state, and a channel state of UEs, and then perform scheduling is required, and the NR NB 3a-10 serves as the device. A single NR NB normally controls a plurality of cells. The NR NB may have a bandwidth equal to or greater than a conventional maximum bandwidth in order to implement a super-high-speed data transmission, compared to the conventional LTE, and may use orthogonal frequency division multiplexing (hereinafter, referred to as OFDM) as a wireless access technology while additionally combining a beamforming technology to the OFDM. Further, the NR NB applies an adaptive modulation and coding (hereinafter, referred to as AMC) scheme of determining a channel coding rate and a modulation scheme according to the channel state of the terminal. The NR CN 3a-05 is configured to perform functions, such as mobility support, bearer configuration, and QoS configuration. The NR CN is a device serving various control functions as well as a mobility management function for the terminal and is connected to a plurality of base stations. In addition, the next generation mobile communication system may interwork with the conventional LTE system, and the NR CN is connected to a MME 3a-25 through a network interface. The MME is connected to an eNB 3a-30 which is a conventional base station.

Figure 3B:
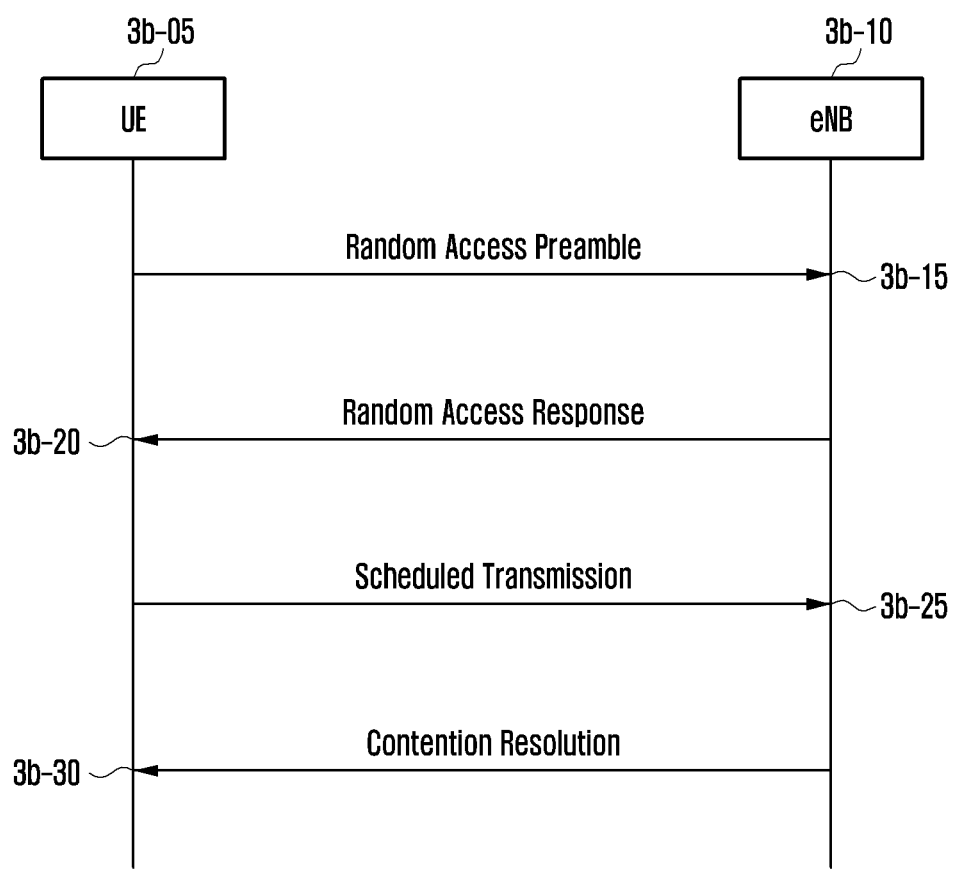
FIG. 3B illustrates a random access procedure in a conventional LTE system.

FIG. 3B illustrates a random access procedure in a conventional LTE system.

Random access is performed at the time of establishing uplink synchronization or transmitting data through a network. More specifically, random access may be performed when a mode is converted from a standby mode to a connection mode, RRC re-establishment is performed, handover is performed, or uplink or downlink data starts. If a terminal 3b-05 receives a dedicated preamble from a base station 3b-10, the terminal applies the dedicated preamble to transmit a preamble (operation 3b-15). Otherwise, the terminal selects one group among two preamble groups and selects a preamble belonging to the selected group. The groups are called group A and group B. If a channel quality state is better than a particular threshold value and the size of msg 3 is greater than a particular threshold value, the terminal selects a preamble belonging to group A, and otherwise, the terminal selects a preamble belonging to group B. If the preamble is transmitted in an n-th subframe (operation 3b-15), a RAR window starts from a (n+3)th subframe, and the terminal monitors whether a RAR is transmitted within the time interval of the window (operation 3b-20). Scheduling information relating to the RAR is indicated by a RA-RNTI of a PDCCH. The RA-RNTI is derived by using a wireless resource position in time and frequency axes, which has been used to transmit the preamble. The RAR includes a timing advance command, an UL grant, and a temporary C-RNTI. If the RAR is successfully received within the RAR window, the terminal transmits msg 3 by using information relating to the UL grant included in the RAR (operation 3b-25). Msg 3 includes different pieces of information according to purposes of the random access. Table 2 below shows an example of pieces of information carried by msg 3.

TABLE 2

| Example of pieces of information included in msg 3 | |
|---|---|
| CASE | Message 3 Contents |
| RRC CONNECTION SETUP | CCCH SDU |
| RRC RE-ESTABLISHMENT | CCCH SDU, BSR (if grant is enough), PHR (if triggered & grant is enough) |
| Handover (random preamble) | C-RNTI CE, BSR, PHR, (part of) DCCH SDU |
| Handover (dedicate preamble) | BSR, PHR, (part of) DCCH SDU |
| UL resume | C-RNTI CE, BSR, PHR, (part of) DCCH/DTCH SDU |
| PDCCH order (random preamble) | C-RNTI CE, BSR, PHR, (part of) DCCH/DTCH SDU |
| PDCCH order (dedicate preamble) | BSR, PHR, (part of) DCCH/DTCH SDU |

If the terminal receives the RAR in an n-th subframe, msg 3 is transmitted in a (n+6)th subframe. An HARQ is applied to and after msg 3. After the transmission of msg 3, the terminal operates a particular timer, and monitors a contention resolution (CR) message until before the timer has expired (operation 3b-30). The CR message includes, as well as a CR MAC CE, a RRC connection setup message, a RRC connection reestablishment message, or the like according to purposes of the random access.

Figure 3C:
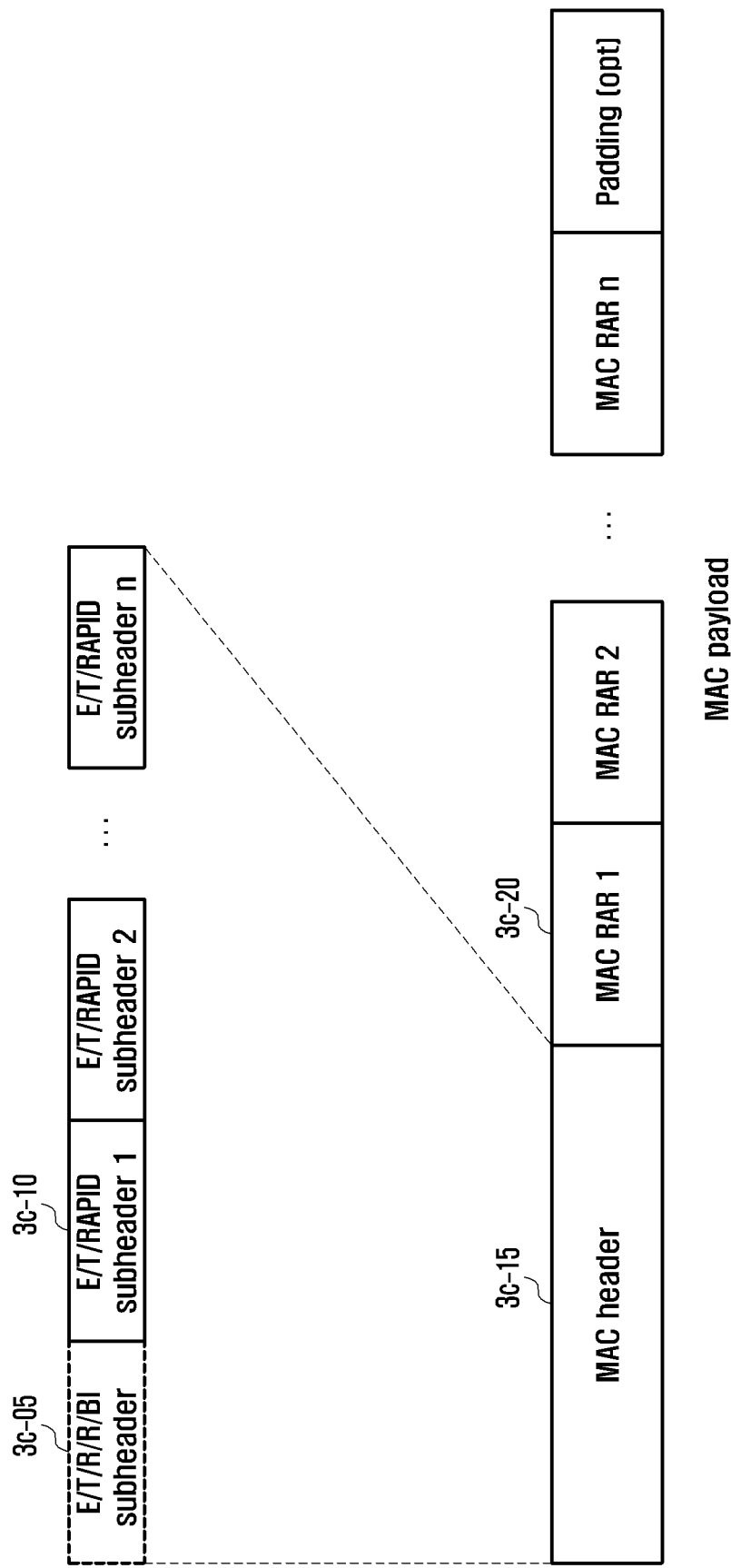
FIG. 3C illustrates a configuration of a random access response message in the disclosure.

FIG. 3C illustrates a configuration of a random access response message in a LTE technology.

In a LTE mobile communication system, a RAR includes at least one subheader and at least one MAC RAR. A MAC header 3c-15 including one or more subheaders is positioned in the front portion of the RAR. A part 3c-05 of the subheaders includes a BI, and a MAC RAR corresponding to the part of the subheaders does not exist. In addition, a single MAC RAR 3c-20 corresponding to each of subheaders 3c-10, which includes the ID of a preamble, exists.

Figure 3D:
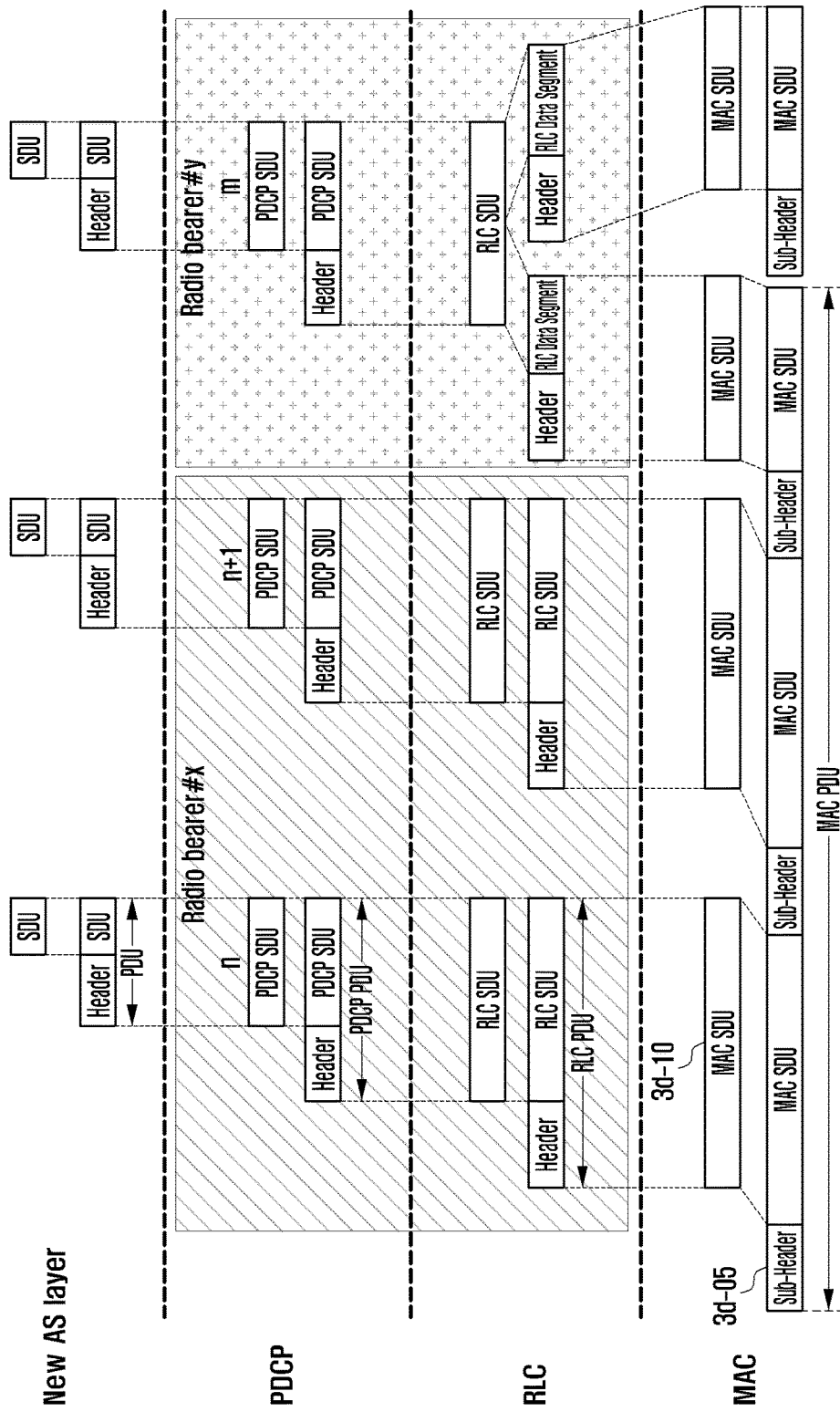
FIG. 3D illustrates a configuration of a MAC PDU in a next generation mobile communication system.

FIG. 3D illustrates a configuration of a MAC PDU in a next generation mobile communication system.

In order to process a packet transmitted at a high speed in a next generation mobile communication system, there is a need to exclude an operation causing complexity in a L2 layer. Therefore, the next generation mobile communication system has not allowed a RLC concatenation operation, which is possible in a LTE technology. Therefore, a RLC layer may previously generate a RLC SDU and a corresponding header before a terminal receives an UL grant, and transfer the RLC SDU and the corresponding header to a lower layer immediately at the time of receiving the UL grant. In a MAC layer, in order to immediately process a MAC SDU 3d-10 having been completely received in a MAC PDU being received by a receiving area, a subheader 3d-05 corresponding to the MAC SDU is inserted right in front of the MAC SDU. Therefore, in a basic configuration of a MAC PDU, a subheader and a MAC SDU corresponding to the subheader are inserted sequentially while being combined into a pair. The structure is called a dispersed format in the disclosure.

A special configuration of a MAC PDU is a random access response MAC PDU. The MAC PDU may have a dispersed format like the normal MAC PDU. In the disclosure, a dispersed format of a random access response MAC PDU is introduced and an operation of a terminal processing the MAC PDU is proposed.

Figure 3E:
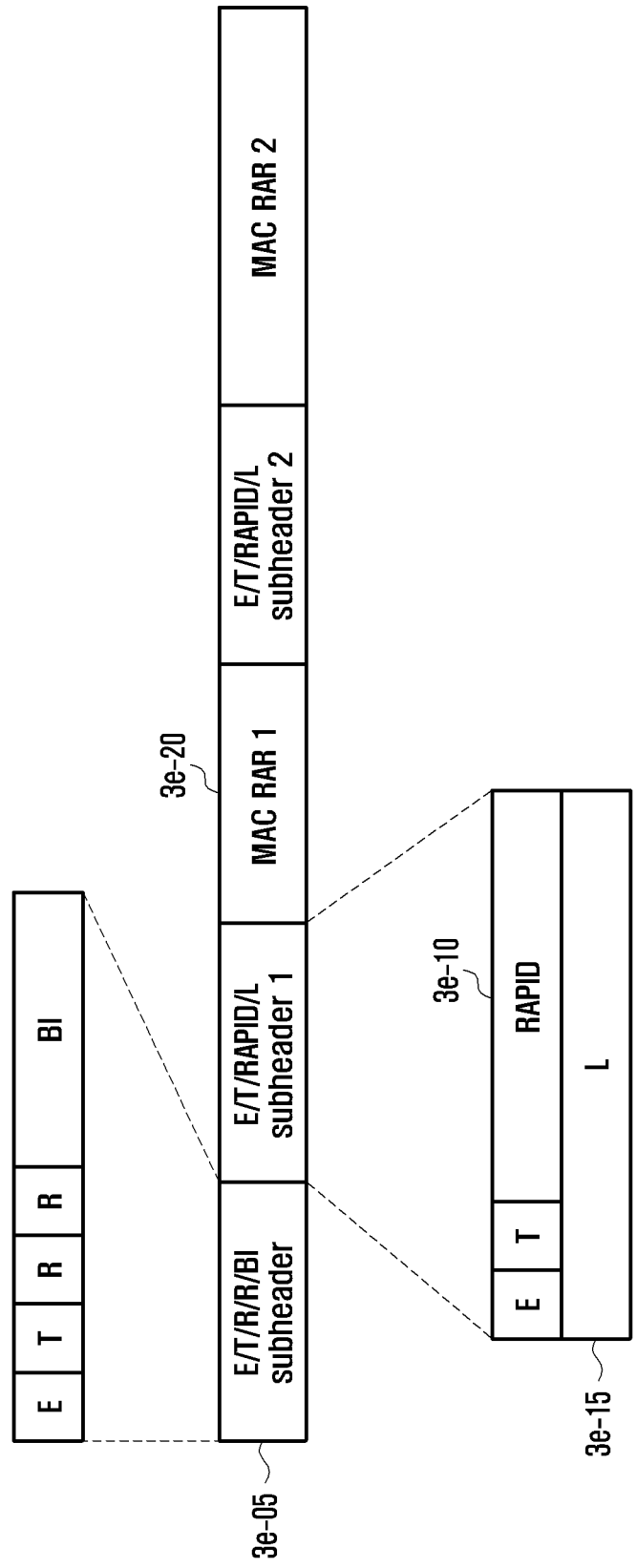
FIG. 3E illustrates two embodiments for a configuration of a random access response message in a next generation mobile communication system.

FIG. 3E illustrates a first method for a configuration of a random access response message in a next generation mobile communication system.

The first method is to apply a dispersed format even to a random access response MAC PDU. If a subheader 3e-05 having a BI field is included in a random access response PDU, the subheader is positioned in the foremost portion of a random access response MAC PDU. A subheader including a RAPID field 3e-10 is positioned right in front of a MAC RAR 3e-20 corresponding to the subheader. The random access response MAC PDU is received by a plurality of unspecified terminals having various releases. Therefore, a terminal having release N may fail to understand a format of release N+1. Therefore, in the disclosure, for future proof, an L field 3e-15 is introduced in the subheader of the random access response MAC PDU. In the case where padding is allowed to be included in the random access response MAC PDU, even if there is an L field, whether a next subheader exists should be indicated by using a E bit. If the length of the MAC RAR 3e-20 is fixed, the L field is not required and an E field may be used to determine a MAC subheader, up to which the terminal should perform decoding.

A second method for a configuration of a random access response message is to follow a format (FIG. 3c) in a conventional LTE technology.

Figure 3F:
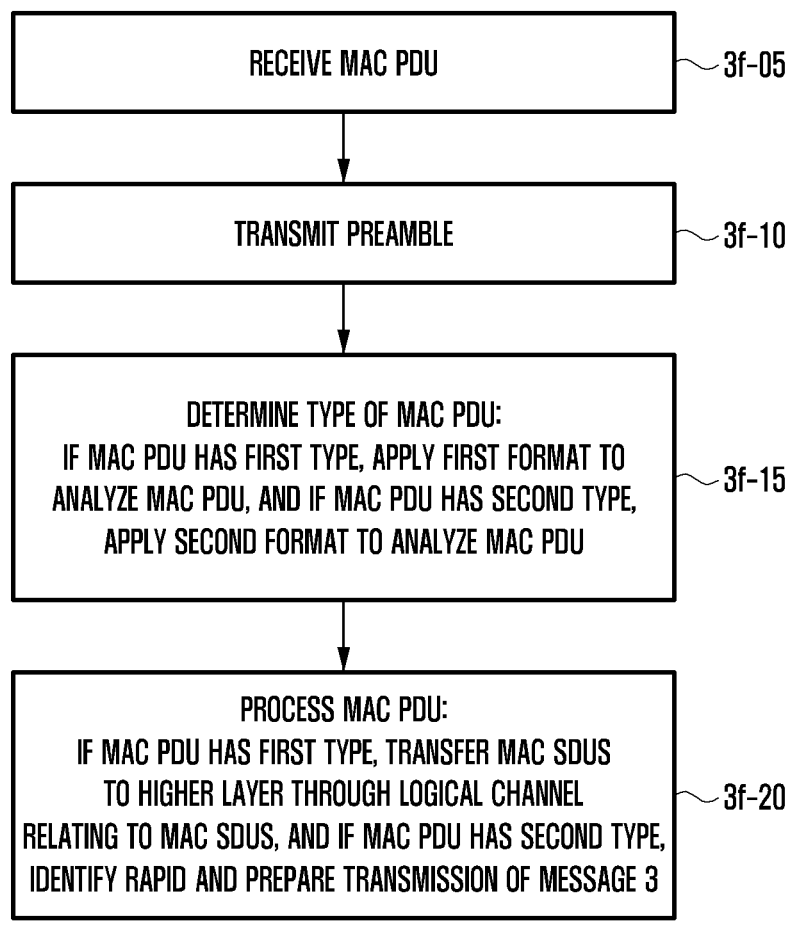
FIG. 3F illustrates an operation (applying a second embodiment for a configuration of a random access response message) of a terminal processing a MAC PDU and a random access response message in a next generation mobile communication system.

FIG. 3F illustrates an operation (applying the second method for a configuration of a random access response message) of a terminal processing a MAC PDU and a random access response message in a next generation mobile communication system.

If a configuration of a random access response message follows the second method, a terminal should determine the type of a MAC PDU and process the MAC PDU in consideration of a format corresponding to the type. In the disclosure, a specific operation of a terminal processing a particular MAC PDU when a terminal receives the MAC PDU is proposed. In operation 3f-05, the terminal receives a single MAC PDU. In operation 3f-10, the terminal transmits a preamble. In operation 3f-15, the terminal determines the type of the received MAC PDU. If the MAC PDU is a first type, the terminal applies a first format to analyze the MAC PDU. If the MAC PDU is a second type, the terminal applies a second format to analyze the MAC PDU. The first type is a type of a MAC PDU which is addressed by a DL-SCH except transparent MAC and Random Access Response, MCH, a C-RNTI, or a SPS C-RNTI, and the second type is a type of a MAC PDU which is addressed by a Random Access Response or a RA-RNTI. In the first format, a single MAC element is configured by only a MAC subheader, the combination (MAC subheader+MAC CE) of a MAC subheader and a MAC CE, or the combination (MAC subheader+MAC SDU) of a MAC subheader and a MAC SDU, and MAC elements for a MAC CE (excluding padding MAC CE) are disposed first, MAC elements for a MAC SDU are disposed next to the MAC elements, and then a MAC element for padding is disposed at the rearmost. In a single MAC element of the second format, MAC subheaders are arranged first and MAC RARs are arranged according to the order of the MAC subheaders. In operation 3f-20, the terminal processes the MAC PDU. If the MAC PDU has the first type, the terminal transfers MAC SDUs to a higher layer through a logical channel relating to the MAC SDUs. If the MAC PDU has the second type, the terminal identifies a RAPID and prepares transmission of message 3.

Figure 3G:
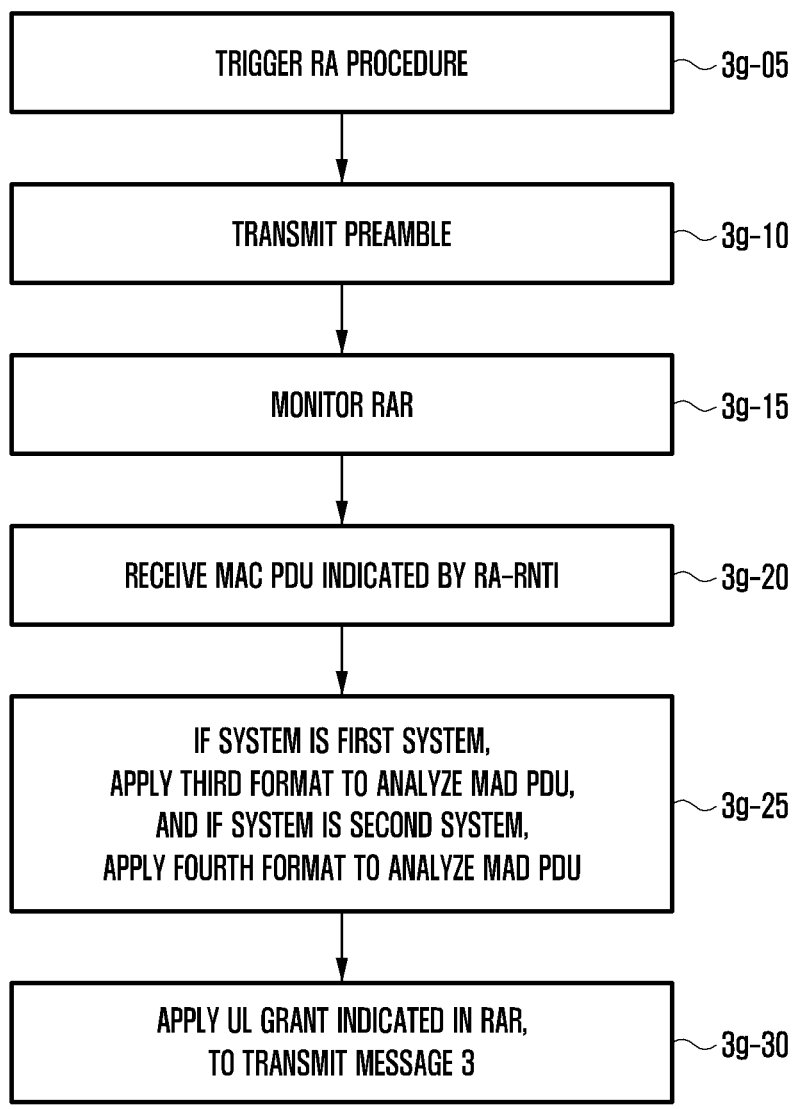
FIG. 3G illustrates an operation (applying the first method for a configuration of a random access response message) of a terminal processing a random access response message in a LTE-next generation mobile communication system multi-connection scenario.

FIG. 3G illustrates an operation (applying the first method for a configuration of a random access response message) of a terminal processing a random access response message in a LTE-next generation mobile communication system multi-connection scenario.

If the first method is applied for a configuration of a random access response message, the random access response message is required to be processed identically to a normal MAC PDU. Meanwhile, in a LTE-next generation mobile communication system multi-connection scenario, since a MAC PDU received in LTE has a format different from that of a random access response message received in a next generation mobile communication system, an operation of a terminal performing processing while distinguishing between the formats is required. In operation 3g-05, the terminal triggers a random access (RA) procedure. In operation 3g-10, the terminal transmits a preamble. In operation 3g-15, the terminal monitors whether a RAR corresponding to the transmitted preamble is received during a configured RAR window. In operation 3g-20, the terminal receives a MAC PDU indicated by a RA-RNTI. In operation 3g-25, if a system having received the MAC PDU is a first system, the terminal applies a third format to analyze the received MAC PDU. If the system is a second system, the terminal applies a fourth format to analyze the received MAC PDU. The first system is LTE, and the second system is a next generation mobile communication system. The third format is a structure in a BI subheader is positioned at the foremost, RAR subheaders are positioned next to the BI subheader, and RARs are positioned according to the order of the RAR subheaders, wherein a BO subheader does not include an L field. The fourth format is a structure in which a BI subheader is positioned at the foremost, a RAR subheader and a RAR relating to the RAR subheader are positioned adjacent to each other, wherein an L field does not exist in a BO subheader, and an L field may exist in a RAR subheader. An E field is also used while the format is used, and the use is distinguished from a normal MAC PDU in a next generation mobile communication system, which does not include an E field. In operation 3g-30, the terminal applies a UL grant included in the RAR, to prepare transmission of message 3.

Figure 3H:
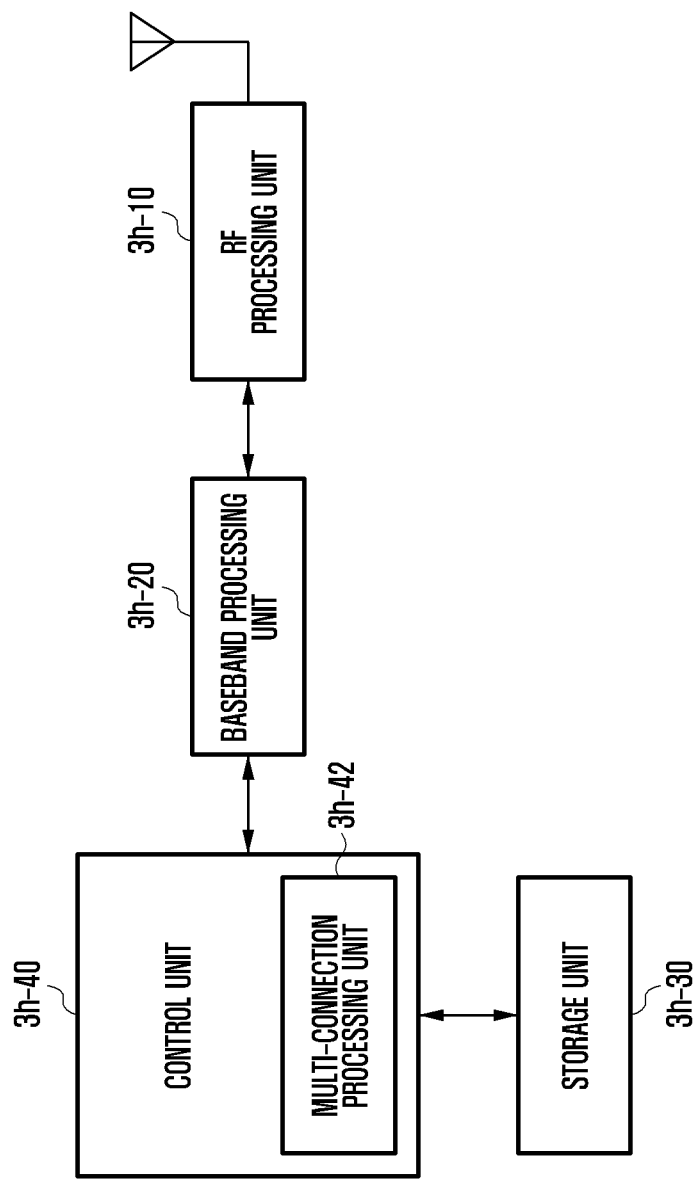
FIG. 3H is a block diagram illustrating an internal structure of a terminal to which the disclosure is applied.

FIG. 3H illustrates a structure of a terminal.

Referring to FIG. 3H, the terminal includes a radio frequency (RF) processing unit 3h-10, a baseband processing unit 3h-20, a storage unit 3h-30, and a control unit 3h-40.

The RF processing unit 3h-10 performs a function for transmitting or receiving a signal through a wireless channel, such as band conversion and amplification of a signal. That is, the RF processing unit 3h-10 upconverts a baseband signal provided from the baseband processing unit 3h-20, into an RF band signal, and then transmits the converted signal through an antenna, and downconverts an RF band signal received through the antenna, into a baseband signal. For example, the RF processing unit 3h-10 may include a transmission filter, a reception filter, an amplifier, a mixer, an oscillator, a digital-to-analog convertor (DAC), an analog-to-digital convertor (ADC), and the like. FIG. 3H illustrates only a single antenna, but the terminal may include a plurality of antennas. In addition, the RF processing unit 3h-10 may include a plurality of RF chains. Moreover, the RF processing unit 3h-10 may perform beamforming. For the beamforming, the RF processing unit 3h-10 may control a phase and a size of each of signals transmitted or received through a plurality of antennas or antenna elements. In addition, the RF processing unit may perform MIMO, and may receive several layers at the time of performing a MIMO operation.

The baseband processing unit 3h-20 performs a function of conversion between a baseband signal and a bitstream according to a physical layer standard of the system. For example, when data is transmitted, the baseband processing unit 3h-20 generates complex symbols by encoding and modulating a transmission bitstream. Further, when data is received, the baseband processing unit 3h-20 reconstructs a reception bitstream by demodulating and decoding a baseband signal provided from the RF processing unit 3h-10. For example, in an orthogonal frequency division multiplexing (OFDM) scheme, when data is transmitted, the baseband processing unit 3h-20 generates complex symbols by encoding and modulating a transmission bitstream, maps the complex symbols to subcarriers, and then configures OFDM symbols through an inverse fast Fourier transform (IFFT) operation and a cyclic prefix (CP) insertion. Further, when data is received, the baseband processing unit 3h-20 divides a baseband signal provided from the RF processing unit 3h-10 in the units of OFDM symbols, reconstructs signals mapped to subcarriers, through a fast Fourier transform (FFT) operation, and then reconstructs a reception bitstream through demodulation and decoding.

The baseband processing unit 3h-20 and the RF processing unit 3h-10 transmit and receive a signal as described above. Accordingly, the baseband processing unit 3h-20 and the RF processing unit 3h-10 may be referred to as a transmitter, a receiver, a transceiver, or a communication unit. Further, at least one of the baseband processing unit 3h-20 and the RF processing unit 3h-10 may include a plurality of communication modules to support a plurality of different wireless access technologies. In addition, at least one of the baseband processing unit 3h-20 and the RF processing unit 3h-10 may include different communication modules to process signals of different frequency bands. For example, the different wireless access technologies may include a wireless LAN (for example, IEEE 802.11), a cellular network (for example, LTE), and the like. Further, the different frequency bands may include a super high frequency (SHF) (for example, 2.NRHz, NRhz) band and a millimeter (mm) wave (for example, 60 GHz) band.

The storage unit 3h-30 stores data such as a basic program, an application program, and configuration information for the operation of the terminal. Particularly, the storage unit 3h-30 may store information relating to a second access node configured to perform wireless communication by using a second wireless access technology. Further, the storage unit 3h-30 provides stored data in response to a request of the control unit 3h-40.

The control unit 3h-40 controls overall operations of the terminal. For example, the control unit 3h-40 transmits or receives a signal through the baseband processing unit 3h-20 and the RF processing unit 3h-10. Further, the control unit 3h-40 records and reads data in and from the storage unit 3h-40. To this end, the control unit 3h-40 may include at least one processor. For example, the control unit 3h-40 may include a communication processor (CP) that performs control for communication, and an application processor (AP) that controls a higher layer such as an application program. The control unit 3h-40 includes a multi-connection processing unit 3h-42 that performs processing for operating a multi-connection mode.

Figure 3I:
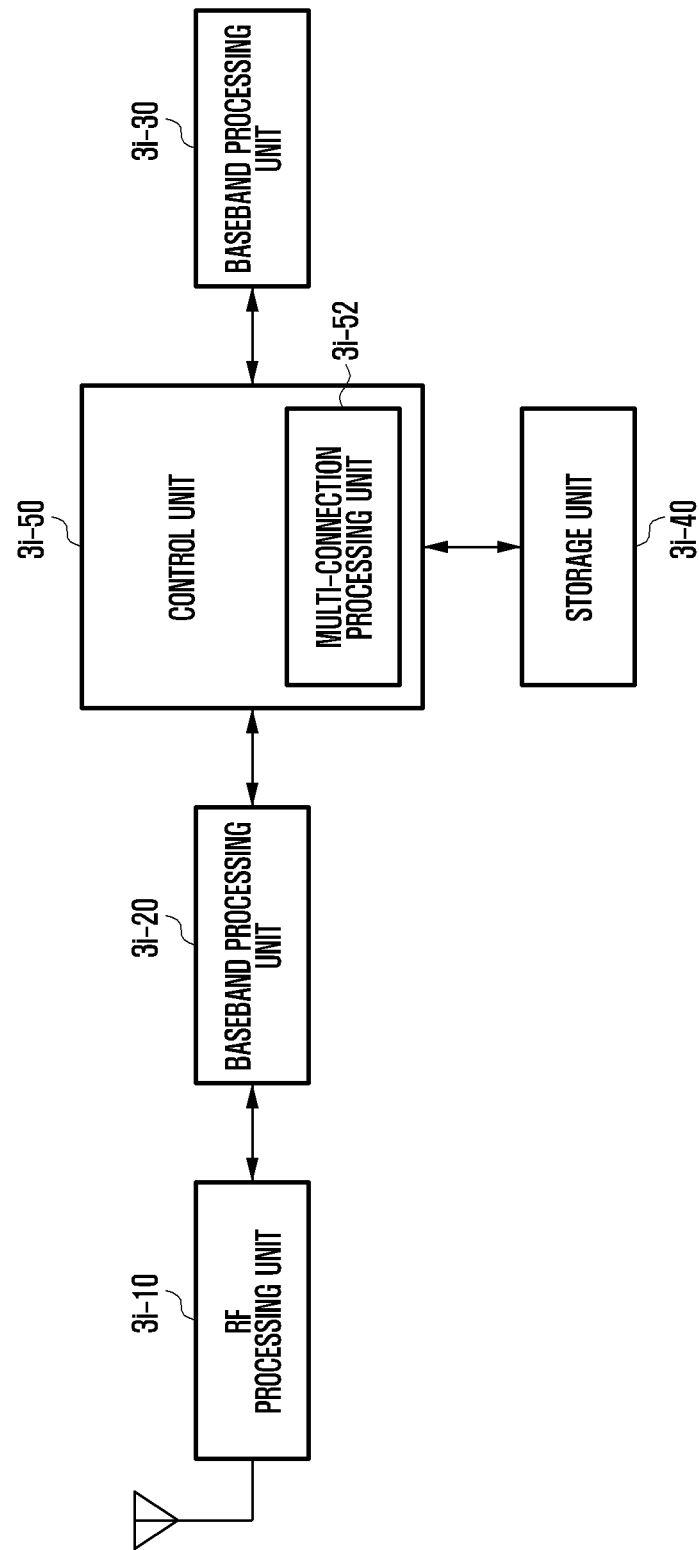
FIG. 3I is a block diagram illustrating a configuration of a base station according to the disclosure.

FIG. 3I illustrates a block diagram of a main base station in a wireless communication system according to an embodiment of the disclosure.

As illustrated in FIG. 3I, the base station includes an RF processing unit 3i-10, a baseband processing unit 3i-20, a backhaul communication unit 3i-30, a storage unit 3i-40, and a control unit 3i-50.

The RF processing unit 3i-10 performs a function for transmitting or receiving a signal through a wireless channel, such as band conversion and amplification of a signal. That is, the RF processing unit 3i-10 upconverts a baseband signal provided from the baseband processing unit 3i-20 into an RF band signal and then transmits the converted signal through an antenna, and downconverts an RF band signal received through the antenna into a baseband signal. For example, the RF processing unit 3i-10 may include a transmission filter, a reception filter, an amplifier, a mixer, an oscillator, a DAC, an ADC, and the like. FIG. 3H illustrates only a single antenna, but the base station may include a plurality of antennas. In addition, the RF processing unit 3i-10 may include a plurality of RF chains. Moreover, the RF processing unit 3i-10 may perform beamforming. For the beamforming, the RF processing unit 3i-10 may control a phase and a size of each of signals transmitted or received through a plurality of antennas or antenna elements. The RF processing unit may perform a downlink MIMO operation by transmitting one or more layers.

The baseband processing unit 3i-20 performs a function of conversion between a baseband signal and a bitstream according to a physical layer standard. For example, when data is transmitted, the baseband processing unit 3i-20 generates complex symbols by encoding and modulating a transmission bitstream. Further, when data is received, the baseband processing unit 3i-20 reconstructs a reception bitstream by demodulating and decoding a baseband signal provided from the RF processing unit 3i-10. For example, in an OFDM scheme, when data is transmitted, the baseband processing unit 3i-20 generates complex symbols by encoding and modulating a transmission bitstream, maps the complex symbols to subcarriers, and then configures OFDM symbols through an IFFT operation and a CP insertion. In addition, when data is received, the baseband processing unit 3i-20 divides a baseband signal provided from the RF processing unit 3i-10 in the units of OFDM symbols, reconstructs signals mapped to subcarriers, through an FFT operation, and then reconstructs a reception bitstream through demodulation and decoding. The baseband processing unit 3i-20 and the RF processing unit 3i-10 transmit and receive a signal as described above. Accordingly, the baseband processing unit 3i-20 and the RF processing unit 3i-10 may be referred to as a transmitter, a receiver, a transceiver, a communication unit, or a wireless communication unit.

The backhaul communication unit 3i-30 provides an interface configured to communicate with other nodes in the network. That is, the backhaul communication unit 3i-30 converts, into a physical signal, a bitstream transmitted from the main base station to another node, for example, an auxiliary base station, a core network, etc. and converts, into a bitstream, a physical signal received from the other nodes.

The storage unit 3i-40 stores data such as a basic program, an application program, and configuration information for the operation of the main base station. Particularly, the storage unit 3i-40 may store information relating to a bearer allocated to a connected terminal, a measurement result reported by the connected terminal, and the like. In addition, the storage unit 3i-40 may store information serving as a determination criterion of whether to provide multi-connection to a terminal or stop providing same. In addition, the storage unit 3i-40 provides stored data in response to a request of the control unit 3i-50.

The control unit 3i-50 controls overall operations of the main base station. For example, the control unit 3i-50 transmits or receives a signal through the baseband processing unit 3i-20 and the RF processing unit 3i-10, or through the backhaul communication unit 3i-30. Further, the control unit 3i-50 records and reads data in and from the storage unit 3i-40. To this end, the control unit 3i-50 may include at least one processor. The control unit 3i-50 includes a multi-connection processing unit 3i-52 that performs processing for operating a multi-connection mode.

The invention claimed is:

1. A method for performing random access by a terminal in a wireless communication system supporting beamforming, the method comprising:
   transmitting a first message for performing random access to a base station;
   receiving, from the base station, a second message including information related to backoff of each beam generated by measuring an overhead subframe;
   storing the information related to backoff of each beam;
   transmitting, to the base station, a third message based on uplink grant information included in the second message; and
   resetting the stored information related to backoff of each beam, in case that a fourth message corresponding to the third message is received within a pre-configured time interval after the transmission of the third message.

2. The method of claim 1, further comprising:
   retransmitting the first message, based on the information related to backoff, in case that a fourth message corresponding to the third message is not received within the pre-configured time interval after the transmission of the third message.

3. The method of claim 2,
   wherein the information related to backoff comprises information related to a retransmission timing range of the first message, and
   wherein the retransmitting of the first message comprises:
      determining randomly a retransmission timing of the first message within the retransmission timing range of the first message, and
      retransmitting the first message after the determined retransmission timing.

4. The method of claim 1, further comprising:
   receiving information related to a beam group including at least one beam from the base station,
   wherein the storing of the information related to backoff of each beam comprises storing information related to backoff of each beam group, based on the information related to a beam group.

5. A method for performing random access by a base station in a wireless communication system supporting beamforming, the method comprising:
   receiving a first message for performing random access from a terminal;
   generating information related to backoff of each beam by measuring an overhead subframe;
   transmitting a second message including the information related to backoff of each beam to the terminal; and
   receiving, from the terminal, a third message based on uplink grant information included in the second message,
   wherein the information related to backoff of each beam is stored by the terminal, and
   wherein the stored information related to backoff of each beam is reset, in case that a fourth message corresponding to the third message is received within a pre-configured time interval after the transmission of the third message.

6. The method of claim 5, further comprising:
   transmitting information related to a beam group including at least one beam to the terminal.

7. The method of claim 6, wherein the generating of the information related to backoff of each beam comprises generating information related to backoff of each beam group, based on the information related to a beam group.

8. A terminal of a wireless communication system supporting beamforming, the terminal comprising:
   a transceiver;
   a memory; and
   a at least one processor configured to:
      control the transceiver to transmit a first message for performing random access to a base station,
      receive, from the base station via the transceiver, a second message including information related to backoff of each beam generated by measuring an overhead subframe,
      store the information related to backoff of each beam in the memory,
      control the transceiver to transmit, to the base station, a third message based on uplink grant information included in the second message, and
      reset the stored information related to backoff of each beam which is stored in the memory, in case that a fourth message corresponding to the third message is received within a pre-configured time interval after the transmission of the third message.

9. The terminal of claim 8, wherein the at least one processor is further configured to:
   control the transceiver to, in case that a fourth message corresponding to the third message is not received within the pre-configured time interval after the transmission of the third message, retransmit the first message, based on the information related to backoff.

10. The terminal of claim 9, wherein the information related to backoff comprises information related to a retransmission timing range of the first message, and wherein the at least one processor is further configured to:

determine randomly a retransmission timing of the first message within the retransmission timing range of the first message, and control the transceiver to, after the determined retransmission timing, retransmit the first message.

11. The terminal of claim 8, wherein the at least one processor is further configured to:

receive, via the transceiver, information related to a beam group including at least one beam from the base station, and store information related to backoff of each beam group in the memory, based on the information related to a beam group.

12. A base station of a wireless communication system supporting beamforming, the base station comprising:

a transceiver; and at least one processor configured to:

control the transceiver to receive a first message for performing random access from a terminal, generate information related to backoff of each beam by measuring an overhead subframe, control the transceiver to transmit a second message including the information related to backoff of each beam to the terminal, and control the transceiver to receive, from the terminal, a third message based on uplink grant information included in the second message, wherein the information related to backoff of each beam is stored by the terminal, and wherein the stored information related to backoff of each beam is reset, in case that a fourth message corresponding to the third message is received within a preconfigured time interval after the transmission of the third message.

13. The base station of claim 12, wherein the at least one processor is further configured to control the transceiver to transmit information related to a beam group including at least one beam to the terminal.

* * * * *